United States Patent [19]

Kobayashi

[11] Patent Number: 4,626,940
[45] Date of Patent: Dec. 2, 1986

[54] TAPE RECORDER WITH RECIPROCATING MAGNETIC HEADS

[75] Inventor: Minoru Kobayashi, Tokyo, Japan

[73] Assignee: Olympus Optical Co., Ltd., Tokyo, Japan

[21] Appl. No.: 500,265

[22] Filed: Jun. 2, 1983

[30] Foreign Application Priority Data

| Jun. 7, 1982 [JP] | Japan | 57-97391 |
| Jun. 10, 1982 [JP] | Japan | 57-99524 |
| Jun. 10, 1982 [JP] | Japan | 57-99525 |
| Jun. 10, 1982 [JP] | Japan | 57-99526 |

[51] Int. Cl.⁴ ............................................. G11B 15/18
[52] U.S. Cl. .................................. 360/96.3; 360/96.4
[58] Field of Search ................... 360/96.3, 96.4, 74.1

[56] References Cited

U.S. PATENT DOCUMENTS

| 3,810,240 | 5/1974 | Nozawa . | |
| 4,301,483 | 11/1981 | Santoro | 360/96.3 |
| 4,342,055 | 7/1982 | Osanai | 360/96.3 |
| 4,425,591 | 1/1984 | Ito et al. | 360/96.3 |
| 4,460,932 | 7/1984 | Osanai | 360/74.1 |

FOREIGN PATENT DOCUMENTS 1333416 10/1973 United Kingdom .

Primary Examiner—John H. Wolff
Assistant Examiner—Matthew J. Bussan
Attorney, Agent, or Firm—Frishauf & Partners

[57] ABSTRACT

A tape recorder has a base plate, a capstan rotatably supported by the base plate and a flywheel attached to the capstan. The capstan is rotated by a drive device having a motor and a driving gear mounted on the flywheel coaxial with the capstan. A pair of magnetic heads are movably arranged on the base plate. A moving gear is rotatably supported on the base. A cam member and a push member are mounted on the moving gear. The push member engages with one of the magnetic head to move the head as the moving gear is rotated. A pair of transmission gears are arranged on both sides of the moving gear to be able to engage with the driving gear and moving gear. The transmission gears transmit the driving force of the drive device to the moving gear to rotate the moving gear by engaging with the driving gear and moving gear. The engagement of the transmission gears with the driving gear and moving gear and the rotating angle of the moving gear are controlled by a controlling device.

40 Claims, 13 Drawing Figures

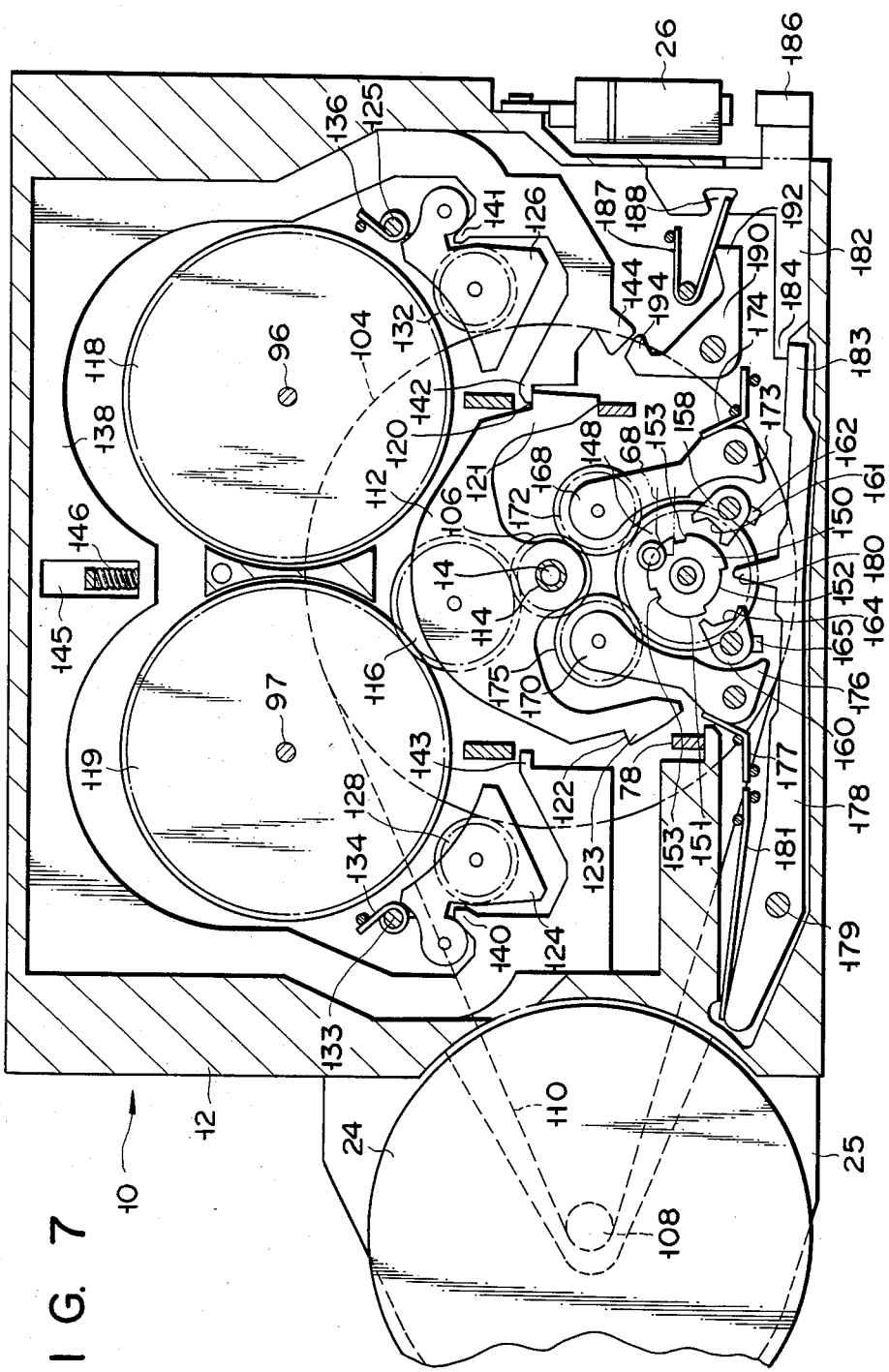

TAPE RECORDER WITH RECIPROCATING MAGNETIC HEADS

BACKGROUND OF THE INVENTION

This invention relates to a tape recorder, more specifically to a tape recorder and wherein magnetic heads are electrically shifted.

In tape recorders which electrically shift magnetic heads, the magnetic heads are transferred by a plunger or an exclusive-use motor separate from a capstan drive motor. Owing to the electrical magnetic head shifting system, the tape recorders of this type can use touch switches. Since the plunger and motor, however, are relatively bulky, it is difficult to miniaturize these tape recorders. Because they require relatively high power consumption, moreover, the plunger or motor lowers the economical efficiency of the tape recorders, and this arrangement cannot easily be applied to portable tape recorders which use dry cells or the like.

SUMMARY OF THE INVENTION

This invention is contrived in consideration of these circumstances, and is intended to provide a tape recorder capable of electrical magnetic head shifting, and is improved in terms of compactness and economical efficiency.

According to an aspect of the invention, there is provided a tape recorder which comprises drive means for rotating a capstan, magnetic reproducing means arranged on a base for reciprocation along a predetermined direction between an advanced position where the reproducing means is in contact with a magnetic tape and a retreated position where the reproducing means is separated from the magnetic tape, rocking means rockably supported on the base for engaging with the magnetic reproducing means to move the reproducing means in the predetermined direction by rocking, transmission means for engaging the drive means and the rocking means to transmit the driving force of the drive means to the rocking means to rock the rocking means, and control means for controlling the engagement of the transmission means with the rocking means and the drive means and the rocking of the rocking means, thereby controlling the movement of the magnetic reproducing means.

According to the tape recorder of the invention, the magnetic heads are moved by the driving force of the drive means through the medium of the rocking means and the transmission means which are controlled by the control means. Thus, according to this tape recorder, the magnetic heads are shifted by means of the drive means for driving the capstan. Because it requires neither an exclusive-use motor nor a plunger for shifting the magnetic heads, the tape recorder can be miniaturized while also providing improved economical efficiency.

BRIEF DESCRIPTION OF THE DRAWINGS

FIGS. 1 to 12 show a tape recorder according to an embodiment of this invention, in which:

FIGS. 1 and 4 are a plan view and a sectional view, respectively, of the tape recorder in a forward playback mode, FIG. 2 is a partial enlarged perspective view, FIG. 3 is a perspective view showing a recording/plakback head and a pinch roller, FIGS. 5 and 6 are assembled and exploded perspective views of a rocking member, respectively, FIG. 7 is a sectional view of the tape recorder being shifted from the forward playback mode to a stop mode, FIGS. 8 and 9 are a plan view and a sectional view, respectively, of the tape recorder in the stop mode, FIG. 10 is a sectional view of the tape recorder being shifted from the forward playback mode to a reverse playback mode, and FIGS. 11 and 12 are a plan view and a sectional view, respectively, of the tape recorder in the reverse playback mode.

DETAILED DESCRIPTION OF THE PREFERRED EMBODIMENT

There will now be described in detail one embodiment of this invention with reference to the accompanying drawings.

Figure 1:
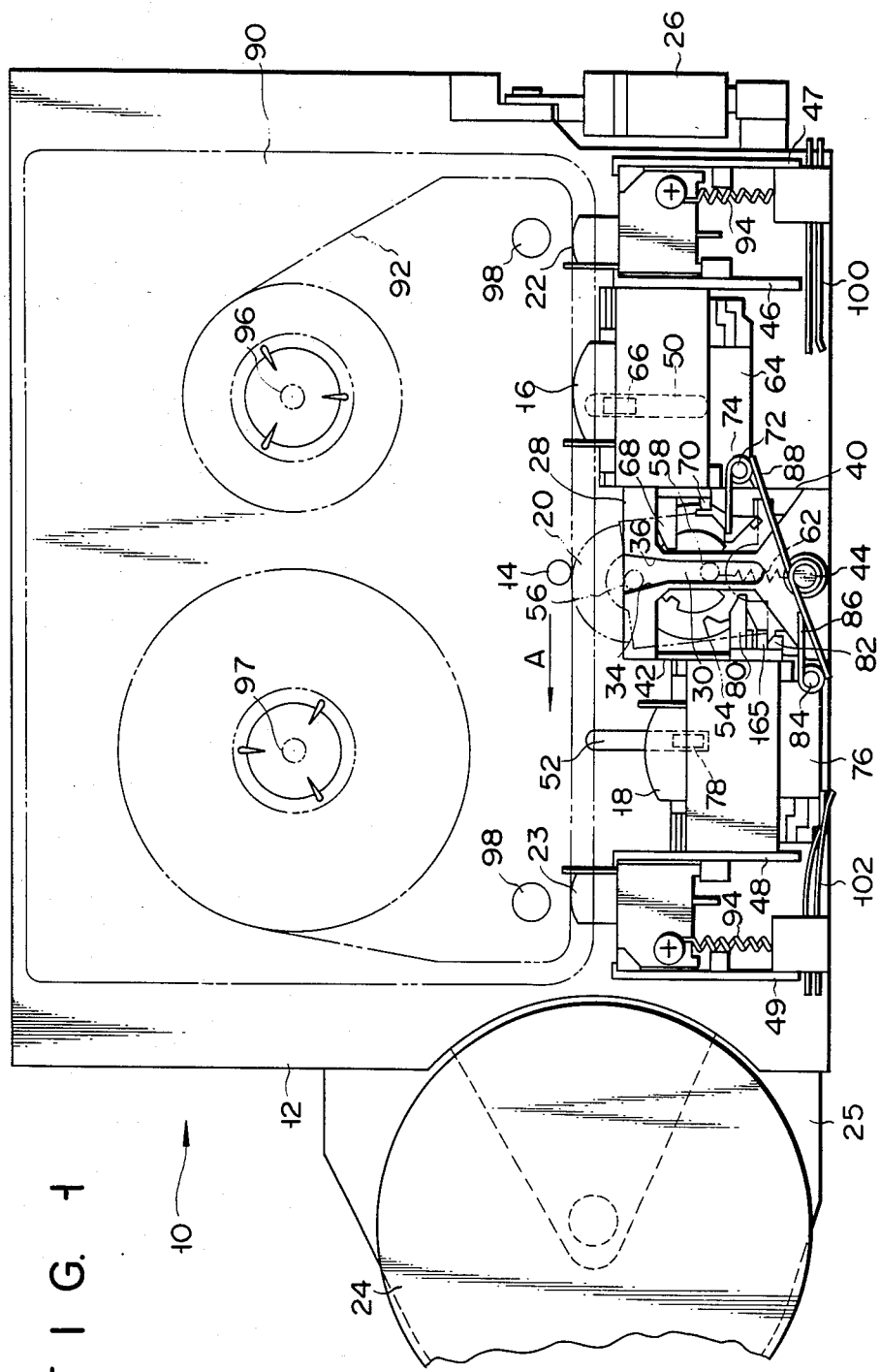

As shown in FIG. 1, an auto-reverse-type tape recorder 10 is a tape recorder of a center capstan type which is provided with a base plate 12, a capstan 14, and first and second recording/playback heads 16 and 18 on both sides of the capstan 14. Also, the tape recorder 10 has a pinch roller 20 between the first and second heads 16 and 18, and a pair of erasing heads 22 and 23. The tape recorder 10 is further provided with a motor 24 attached to the base plate 12 by means of a support plate 25 for driving the capstan 14, and a trigger magnet 26 attached to the base plate 12 for controlling the movement of the first and second recording/playback heads 16 and 18. The trigger magnet 26 includes a magnet and a coil thereon. When the coil is energized, magnetic flux of the magnet is killed by a magnetic field generated in the coil. Thus, while the coil is in conduction, the magnet has no attraction.

Figure 2:
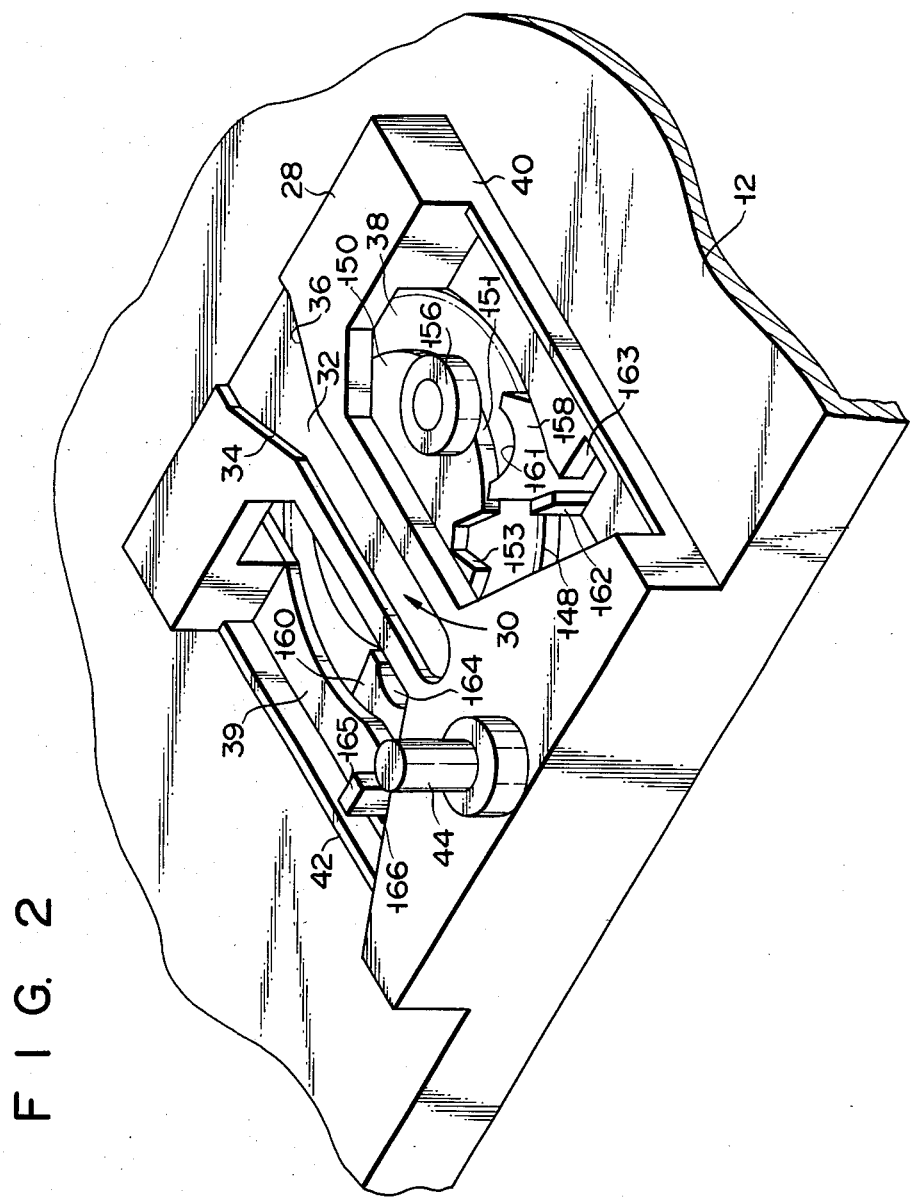

As shown in FIGS. 1 and 2, a rectangular projection 28 is formed in the center of the lower end portion of the base plate 12. Two lateral faces 40 and 42 of the projection 28 extend, vertically. A guide groove 30 for guiding the pinch roller 20 is formed in the projection 28. The guide groove 30 has a straight portion 32 extending straight toward the capstan 14, that is, at right angles to the course of a magnetic tape 92 in a tape cassette 90, and first and second pinch roller guide surfaces 34 and 36 extending outward from the straight portion 32 in a spreading manner. The projection 28 has first and second openings 38 and 39 formed on both sides of the guide groove 30, individually. The openings 38 and 39 penetrate the projection 28 to reach the back of the base plate 12, and connect with each other. Under the guide groove 30, a stepped spring retaining pin 44 is erected on the projection 28. The base plate 12 has a pair of guide walls 46 and 47 extending parallel to the lateral face 40 of the projection 28 and to each other on the right-hand side of the projection 28, and another pair of guide walls 48 and 49 extending parallel to the lateral face 42 of the projection 28 and to each other on the left-hand side of the projection 28. The base plate 12 also has a first guide slot 50 between the projection 28 and the guide wall 46, and a second guide slot 52 between the projection 28 and the guide wall 48. The first and second guide slots 50 and 52 penetrate the base plate 12, and extend vertically.

Figure 3:
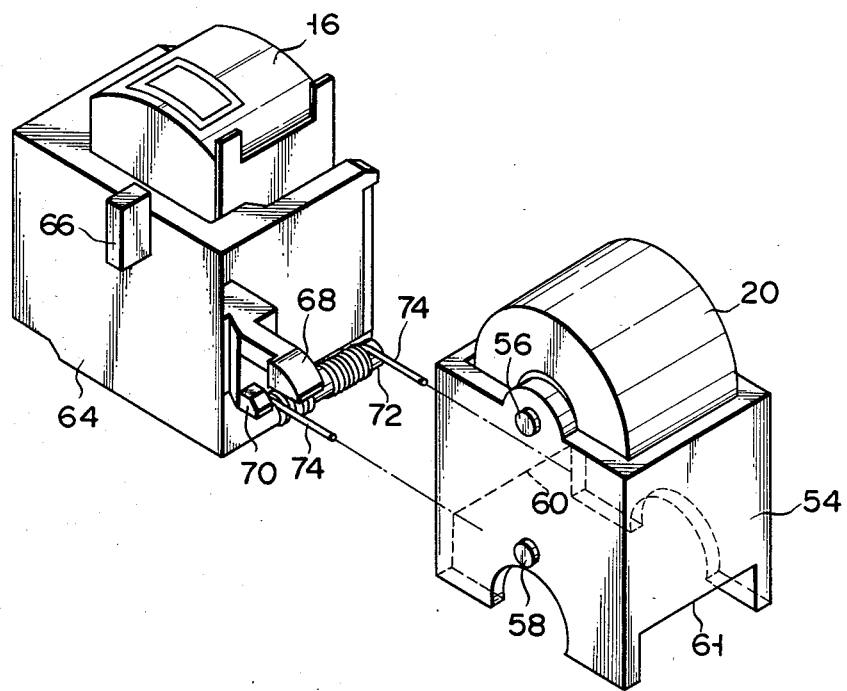

As shown in FIGS. 1 and 3, the pinch roller 20 is rotatably mounted on a pinch roller support frame 54 by means of a support pin 56. The support pin 56 penetrates the support frame 54 to project from the bottom thereof. The support frame 54 has a guide pin 58 protruding from its bottom. Push portions 60 and 61 are formed on both side edges of the support frame 54 at the rear end portion thereof. The pinch roller 20 and the support frame 54 are set on the projection 28 so that the support pin 56 and the guide pin 58 project into the guide groove 30 and can move along the same. The support frame 54 is urged downward or in the direction to move away from the capstan 14 by a tension spring 62 which is stretched between the support frame 54 and the spring retaining pin 44. The first recording/playback head 16 is mounted on a head support frame 64. The support frame 64 has a push lug 66 protruding from its bottom, and a push claw 68 and a lock claw 70 protruding from the lower portion of a lateral face of the support frame 64. The support frame 64 also has a support pin 72 standing at the rear end portion thereof. A pair of torsion springs 74 as pinch roller push members are wound around the support pin 72. The extreme end of each torsion spring 74 can press on the push portion 60 of the pinch roller support frame 54. The first recording/playback head 16 and the support frame 64 are arranged between the projection 28 and the guide wall 46. The lower end portions of both lateral faces of the support frame 64 abut against the lateral face 40 of the projection 28 and the guide wall 46, individually. Thus, the first head 16 and the support frame 64 on the base plate 12 can reciprocate in the direction at right angles to the course of the magnetic tape 92, guided by the lateral face 40 of the projection 28 and the guide wall 46. The push lug 66 of the support frame 64 penetrates the guide slot 50 to project behind the base plate 12. The push claw 68 and the lock claw 70 project into the opening 38 (see FIG. 2) of the projection 28. The second recording/playback head 18 is mounted on a head support frame 76 which forms a symmetrical configuration with the head support frame 64. The support frame 76 has a push lug 78 protruding from its bottom, and a push claw 80 and a lock claw 82 protruding from the lower portion of a lateral face of the support frame 76. The support frame 76 also has a support pin 84 standing at the rear end portion thereof. A pair of torsion springs 86 as pinch roller push members are wound around the support pin 84. The extreme end of each torsion spring 86 can press on the push portion 61 (see FIG. 3) of the pinch roller support frame 54. The lower end portions of both lateral faces of the support frame 76 abut against the lateral face 42 of the projection 28 and the guide wall 48, individually. Thus, the second recording/playback head 18 and the support frame 76 on the base plate 12 can reciprocate in the direction at right angles to the course of the magnetic tape 92, guided by the lateral face 42 of the projection 28 and the guide wall 48. The push lug 78 of the support frame 76 penetrates the guide slot 52 to project behind the base plate 12. The push claw 80 and the lock claw 82 project into the opening 39 (see FIG. 2) of the projection 28. A torsion spring 88 as a magnetic head urging member is wound around the spring retaining pin 44. Both end portions of the torsion spring 88 abut against the support frames 64 and 76, individually. Thus, the support frames 64 and 76 are urged toward the magnetic tape 92 by the torsion spring 88. The erasing heads 22 and 23 are arranged between the guide walls 46 and 47 and between the guide walls 48 and 49, respectively, so that they can move along their corresponding guide walls on the base plate 12. The erasing heads 22 and 23 are urged by their corresponding compression springs 94 to abut against the magnetic tape 92.

FIG. 1 shows a forward playback mode of the tape recorder 10. In this forward playback mode, the first recording/playback head 16, along with the support frame 64, is urged by the torsion spring 88 to move toward the magnetic tape 92 and to be located in an advanced position where the head 16 is in contact with the magnetic tape 92. When the support frame 64 is moved toward the magnetic tape 92, the end portion of each torsion spring 74 abuts against the push portion 60 (see FIG. 3) of the pinch roller support frame 54 to urge the support frame 54 toward the capstan 14 against the urging force of the tension spring 62. At the same time, the torsion springs 74 urge the support frame 54 to rotate counterclockwise around the guide pin 58. When the first head 16 is advanced, therefore, the support pin 56 of the support frame 54 is moved along the first pinch roller guide surface 34 of the guide groove 30 by the urging force of the torsion springs 74. Thus, the pinch roller support frame 54 moves toward the capstan 14 while leaning toward the second recording/playback head 18. As a result, the pinch roller 20 is pressed against the capstan 14 with a slight deflection toward the second head 18 to be located in a first position as illustrated. The pressure of the pinch roller 20 on the capstan 14 is given by the urging force of the torsion springs 74. In FIG. 1, the second recording/playback head 18 and the support frame 76 are located in a second retreated position. In the forward playback mode, the capstan 14 is rotated clockwise by the motor 24, and the magnetic tape 92 is driven in the direction of arrow A, held between the pinch roller 20 and the capstan 14.

In FIG. 1, numerals 96 and 97 designate reel shafts, and numeral 98 denotes a positioning pin for positioning the tape cassette 90. Numerals 100 and 102 designate first and second changeover switches, respectively.

Figure 4:
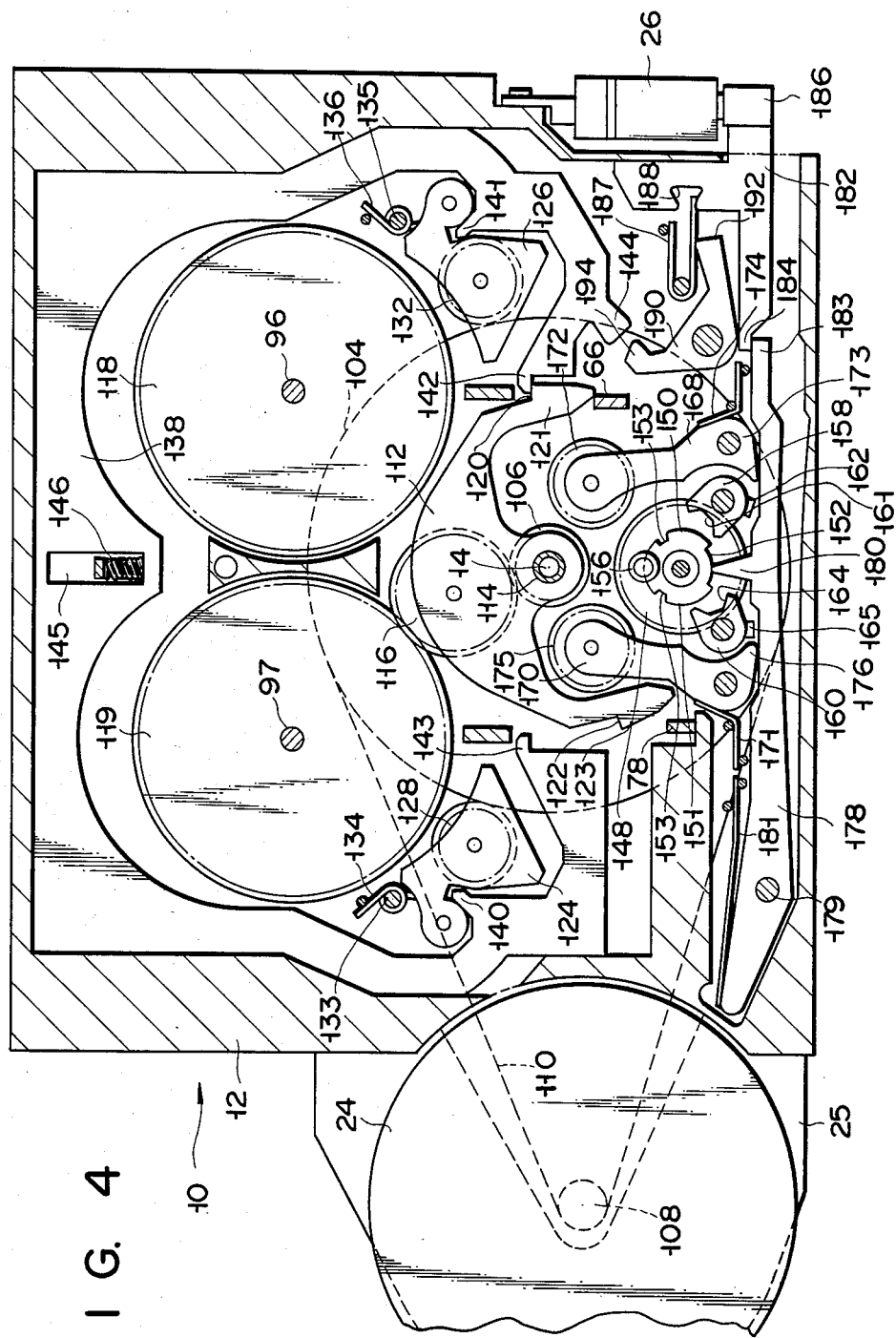
Figure 6:
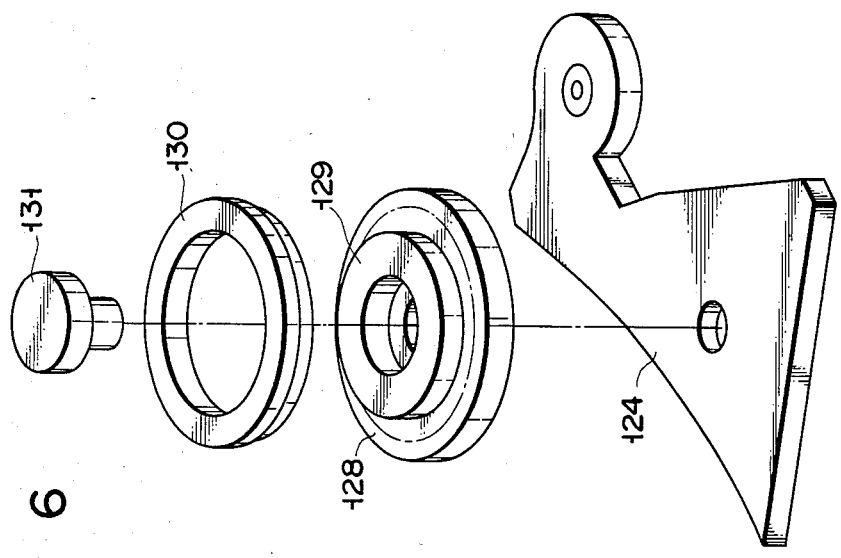
Figure 5:
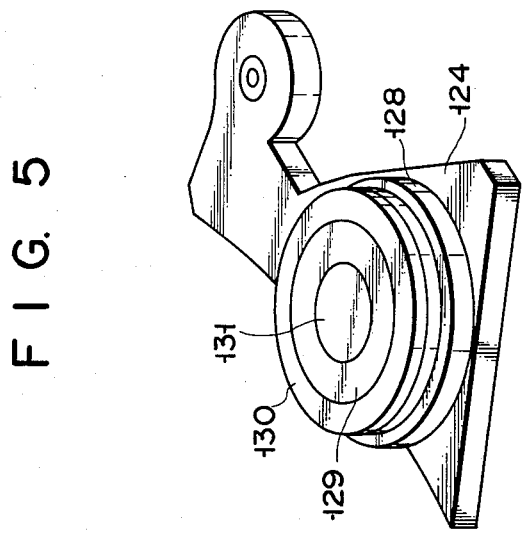

As shown in FIG. 4, the tape recorder 10 is provided with a reel shaft drive mechanism, a magnetic head transfer mechanism, etc., mounted on the backside of the base plate 12. The capstan 14 penetrates the base plate 12 to project behind the same, and a flywheel 104 is mounted on the projected end portion of the capstan 14. A driving gear 106 is coaxially attached to the flywheel 104 so as to be rotated together with the flywheel 104 and the capstan 14. The flywheel 104, the capstan 14, and the driving gear 106 are rotated in either direction by the motor 24 through the medium of a belt 110 passed around the flywheel 104 and a drive shaft 108 of the motor 24. The motor 24 and the driving gear 106 constitute drive means in this invention. A rocking lever 112 is supported between the driving gear 106 and the base plate 12 so as to be rockable around the capstan 14 with the aid of an annular support pin 114 protruding from the base plate 12. An idle gear 116 is rotatably mounted on the rocking lever 112. The idle gear 116, which is in mesh with the driving gear 106, can engage reel gears 118 and 119 that are mounted on the reel shafts 96 and 97, respectively. The rocking lever 112 is symmetrical with respect to a straight line passing through the respective centers of the capstan 14 and the idle gear 116. The rocking lever 112 has on both sides thereof engaging portions 121 and 123 having shoulders 120 and 122, respectively. The engaging portion 121 can engage the push lug 66 of the magnetic head support frame 64 (see FIG. 1), while the engaging portion 123 can engage the push lug 78 of the magnetic head support frame 76. Rocking members 124 and 126 are arranged under the reel gears 119 and 118, respectively. As shown in FIGS. 5 and 6, the rocking member 124 has an interlocking gear 128 which can engage the reel gear 119. A ring-shaped boss 129 is formed coaxially on the interlocking gear 128, and a rubber ring 130 capable of engaging the outer peripheral surface of the flywheel 104 is fitted on the boss 129. The interlocking gear 128 is rotatably mounted on the rocking member 124 by means of a pin 131. As shown in FIG. 4, the rocking member 126, which is a mirror image of the rocking member 124, is provided with an interlocking gear 132 capable of engaging the reel gear 118, and a rubber ring (not shown) which can engage the outer peripheral surface of the flywheel 104 through the medium of the belt 110. The rocking member 124 is urged toward the reel gear 119 and the flywheel 104 by a torsion spring 134 which is wound around a retaining pin 133 protruding from the base plate 12, while the rocking member 126 is urged toward the reel gear 118 and the flywheel 104 by a torsion spring 136 which is wound around a retaining pin 135. The rocking members 124 and 126 are symmetrical with respect to a vertical line passing through the capstan 14. The rocking members 124 and 126, the rocking lever 112, the idle gear 116, and the reel gears 118 and 119 constitute reel shaft drive means in this invention.

A substantially E-shaped sliding plate 138 capable of sliding vertically is mounted on the base plate 12 so as to surround the reel gears 118 and 119. The sliding plate 138 has engaging claws 140 and 141 capable of engaging the rocking members 124 and 126, respectively, and abutting claws 142 and 143 capable of abutting against the shoulders 120 and 122, respectively, of the rocking lever 112. The sliding plate 138 also has a push portion 144 under the abutting claw 142 and a spring retaining slot 145 formed in the center of the upper end portion thereof. The sliding plate 138 is urged downward by a compression spring 146 in the spring retaining slot 145.

FIG. 4 shows the forward playback mode of the tape recorder 10. In this mode, the first recording/playback head 16, along with the support frame 64 (see FIG. 1), is located in its advanced position where it is in contact with the magnetic tape 92, and the push lug 66 is also in its advanced position as illustrated. As the engaging portion 121 of the rocking lever 112 is pressed by the push lug 66, the rocking lever 112 is rocked counterclockwise to be located in the illustrated position, so that the idle gear 116 engages the reel gear 119. As the rocking lever 112 is rocked counterclockwise, the sliding plate 138 rises against the urging force of the compression spring 146 to be located in the illustrated position, having its abutting claw 142 pressed by the shoulder 120 of the rocking lever 112. The rocking members 124 and 126 are pushed by the engaging claws 140 and 141, respectively, of the sliding plate 138, and are separated from the reel gears 118 and 119 and the flywheel 104.

As shown in FIGS. 2 and 4, the tape recorder 10 is provided with a moving gear 148 under the capstan 14. The moving gear 148 has a discoid cam member 150 coaxially formed thereon and protruding therefrom toward the base plate 12. The moving gear 148 and the cam member 150 are formed integrally, and are rotatably mounted on the backside of the base plate 12. A push roller 156 is fixed on the cam member 150. The push roller 156 projects outside of the outer peripheral surface of the cam member 150 and into the openings 38 and 39 of the projection 28. Thus, the push roller 156 can engage the push claws 68 and 80 (see FIG. 1) of the support frames 64 and 76, respectively. Also, the cam member 150 has a cam face 151 formed of its outer peripheral surface, a first cam recess 152 formed in the cam face 151 so as to be diametrically opposite to the push roller 156, and a pair of second cam recesses 153 formed in the cam face 151 so as to be located between the first cam recess and the push roller 156 and at equal distances from the first cam recess 152. The moving gear 148 and the cam member 150 are located on a vertical line passing through the capstan 14. The moving gear 148, the cam member 150, and the push roller 156 constitute rocking means in this invention. Although the moving gear 148, the cam member 150, and the push roller 156 shown in FIG. 2 are located in the positions for the clear illustration of their configurations, they take the positions of FIG. 4 when in the forward playback mode. First and second retaining members 158 and 160 are arranged individually on both sides of the cam member 150 so as to be symmetrical with respect to the vertical line passing through the capstan 14. The retaining members 158 and 160 are rockably mounted on the base plate 12 and located between the base plate 12 and the moving gear 148. The first retaining member 158 has a recess 161 capable of engaging the push roller 156 and a lock lug 162 projecting into the opening 38. The lock lug 162 can engage the lock claw 70 (see FIG. 1) of the magnetic head support frame 64. In the forward playback mode, the first retaining member 158 is located in its first position as shown in FIG. 4. As the retaining member 158 is rocked counterclockwise, the lock lug 162 is located in a recess 163 which is formed in the base plate 12. The second retaining member 160, which is a mirror image of the first retaining member 158, has a recess 164 capable of engaging the push roller 156 and a lock lug 165 projecting into the opening 39. The lock lug 165 can engage the lock claw 82 (see FIG. 1) of the magnetic head support frame 76. In the forward playback mode, the second retaining member 160 is located in its second position as shown in FIG. 4, and the lock lug 165 is located in a recess 166 which is formed in the base plate 12. The lock lug 165 engages the lock claw 82 to lock the support frame 76 and the second recording/playback head 18 to the second retreated position (see FIG. 1). The retaining members 158 and 160 constitute retaining means in this invention.

As shown in FIG. 4, the tape recorder 10 is further provided with a pair of transmission arms 168 and 170 arranged on both sides of the moving gear 148, individually. The transmission arms 168 and 170 are rockably supported by their corresponding support pins protruding from the backside of the base plate 12. The transmission arm 168 has a transmission gear 172 rotatably attached to the upper end portion thereof and capable of engaging the driving gear 106 and the moving gear 148. An engaging portion 173 is formed at the lower end portion of the transmission arm 168. The transmission arm 168 is urged counterclockwise, that is, in such a direction that the transmission gear 172 engages the driving gear 106 and the moving gear 148, by a leaf spring 174 which is attached to the base plate 12. The transmission arm 170, which is a mirror image of the transmission arm 168, has a transmission gear 175 capable of engaging the driving gear 106 and the moving gear 148, and an engaging portion 176. The transmission arm 170 is urged clockwise, that is, in such a direction that the transmission gear 175 engages the driving gear 106 and the moving gear 148, by a leaf spring 177 which is attached to the base plate 12. The transmission arms 168 and 170 are symmetrical with respect to the vertical line passing through the capstan 14. The transmission arms 168 and 170 constitute transmission means in this invention.

The tape recorder 10 also comprises a control lever 178 located under the moving gear 148. The control lever 178 is rockably supported by a support pin 179 protruding from the backside of the base plate 12. The control lever 178 has a retaining claw 180 projecting toward the capstan 14 and capable of engaging the cam member 150. The control lever 178 is urged counterclockwise by a leaf spring 181 which is attached to the base plate 12. Thus, the control lever 178 is located in its operating position as illustrated, and the retaining claw 180 projects into the first cam recess 152 of the cam member 150 to restrain the moving gear 148 from rotating. At the same time, the control lever 178 presses on the respective engaging portions 173 and 176 of the transmission arms 168 and 170 to restrain the transmission arms 168 and 170 from rocking.

The leaf springs 174 and 177 for urging the transmission arms 168 and 170 have a relatively small urging force. Therefore, even though the urging force of the leaf spring 181 urging the control lever 178 is relatively small, the control lever 178 can press on the engaging portions 173 and 176 of the transmission arms 168 and 170 to restrain the arms 168 and 170 from rocking. A boosting plate 182 is disposed at the right of the control lever 178 on the base plate 12 so as to be vertically slidable. The boosting plate 182 has a shoulder 184 abutting against a right end portion 183 of the control lever 178, and an attraction portion 186 attracted to the trigger magnet 26. The boosting plate 182 also has a spring retaining recess 188 engaging a leaf spring 187 attached to the base plate 12, and is urged downward by the leaf spring 187. The control lever 178, the boosting plate 182, and the trigger magnet 26 constitute control means in this invention. Over the boosting plate 182, a push member 190 is rockably supported by a support pin protruding from the backside of the base plate 12. The push member 190 has a push portion 192 capable of pressing the leaf spring 187 and an engaging portion 194 capable of engaging the push portion 144 of the sliding plate 138.

There will now be described in detail the operation of the auto-reverse-type tape recorder 10 of the aforementioned construction.

As mentioned before, FIGS. 1 and 4 show the forward playback mode of the tape recorder 10. In this mode, the capstan 14, the driving gear 106, and the flywheel 104 are rotated clockwise by the motor 24. The reel gear 119 is rotated clockwise by the driving gear 106 through the medium of the idle gear 116. Thus, the magnetic tape 92 is driven in a first feed direction, that is, in the direction of arrow A. In the forward playback mode, moreover, the first recording/playback head 16 is in its advanced position where it is in contact with the magnetic tape 92. The changeover switch 100 is off. The second recording/playback head 18, along with the support frame 76, is locked to its retreated position as illustrated by the lock lug 165 of the retaining member 160. The changeover switch 102 is on, pressed by the support frame 76.

Subsequently, when a stop switch (not shown) is turned on, the trigger magnet 26 is first energized to lose its attraction. As a result, the boosting plate 182 is moved to its second position as shown in FIG. 7 by the urging force of the leaf spring 187. At the same time, the shoulder 184 of the boosting plate 182 presses on the right end portion 183 of the control lever 178 to rock the control lever 178 clockwise to its nonoperating position as illustrated against the urging force of the leaf spring 181.

The urging force of the leaf spring 187 urging the boosting plate 182 is relatively small. As mentioned before, however, the urging force of the leaf spring 181 urging the control lever 178 is also small, so that the boosting plate 182 can rock the control lever 178 clockwise by means of the urging force of the leaf spring 187. Thereupon, the control lever 178 is separated from the respective engaging portions 173 and 176 of the transmission arms 168 and 170, and the retaining claw 180 is disengaged from the first cam recess 152 of the cam member 150. As a result, the moving gear 148 and the transmission arms 168 and 170 are allowed to rotate and rock, respectively. The transmission arm 168 is rocked counterclockwise by the urging force of the leaf spring 174, while the transmission arm 170 is rocked clockwise by the urging force of the leaf spring 177. Thus, the transmission gears 172 and 175 both engage the driving gear 106 and the moving gear 148.

Hereupon, the driving gear 106 is rotated clockwise. Accordingly, the transmission gear 172 is given by the turning effort of the driving gear 106 a force in such a direction that the gear 172 engages the driving gear 106 and the moving gear 148, while the transmission gear 175 is given a force in such a direction that it is disengaged from the driving gear 106 and the moving gear 148. Since the urging force of the leaf springs 174 and 177 urging the transmission arms 168 and 170 is relatively small, as mentioned before, the transmission gear 175 is disengaged from the moving gear 148. Thus, only the transmission gear 172 transmits the driving force of the driving gear 106 to the moving gear 148 to rotate the same clockwise. Also, the cam member 150 and the push roller 156 rotate clockwise in one with the moving gear 148. The push roller 156 abuts against the push claw 68 of the support frame 64, thereby moving the support frame 64 and the first recording/playback head 16 downward against the urging force of the torsion spring 88. As the support frame 64 moves in this manner, the push lug 66 of the support frame 64 also moves downward, so that the sliding plate 138 is slidden downward by the urging force of the compression spring 146. Thus, the rocking lever 112 is rocked clockwise with its shoulder 120 pressed by the abutting claw 142 of the sliding plate 138, and the idle gear 116 is disengaged from the reel gear 119. As the sliding plate 138 moves downward, the push portion 144 of the sliding plate 138 presses on the engaging portion 194 of the push member 190 to rock the push member 190 counterclockwise. As a result, the push portion 192 of the push member 190 presses the boosting plate 182 through the medium of the leaf spring 187 to move the boosting plate 182 upward. By this time, the trigger magnet 26 will have been deenergized and recovered its attraction. Accordingly, the attraction portion 186 of the boosting plate 182 is attracted to the trigger magnet 26.

As mentioned before, the urging force of the leaf spring 187 urging the boosting plate 182 downward is relatively small. Therefore, even though its attraction is small, the trigger magnet 26 can keep on attracting the boosting plate 182 against the urging force of the leaf spring 187. Thus, the trigger magnet 26 need not be very large in size, so that the tape recorder 10 itself can enjoy a compact design. As the sliding plate 138 is moved downward, the engaging claws 140 and 141 of the sliding plate 138 are disengaged from the rocking members 124 and 126, respectively. The rocking member 124 is moved toward the reel gear 119 by the urging force of the torsion spring 134, while the rocking member 126 is moved toward the reel gear 118 by the urging force of the torsion spring 136. As the boosting plate 182 moves upward, moreover, the shoulder 184 of the boosting plate 182 is disengaged from the right end portion 183 of the control lever 178, and the control lever 178 is rocked counterclockwise by the urging force of the leaf spring 181. The retaining claw 180 of the control lever 178 abuts against the cam face 151 of the cam member 150. When the moving gear 148 is further rotated clockwise by the transmission gear 172 so that one of the second cam recesses 153 of the cam member 150 is located over the retaining claw 180, the retaining claw 180 projects into the second cam recess 153 to stop the moving gear 148 from rotating. As the retaining claw 180 projects into the second cam recess 153, the control lever 178 presses on the engaging portions 173 and 176 of the transmission arms 168 and 170 to rock the arms 168 and 170 clockwise and counterclockwise, respectively. As a result, the transmission gears 172 and 175 are disengaged from the driving gear 106 and the moving gear 148. As the magnetic head support frame 64 moves downward, the pinch roller 20 and the support frame 54 are moved downward by the urging force of the tension spring 62 to be separated from the capstan 14.

Figure 8:
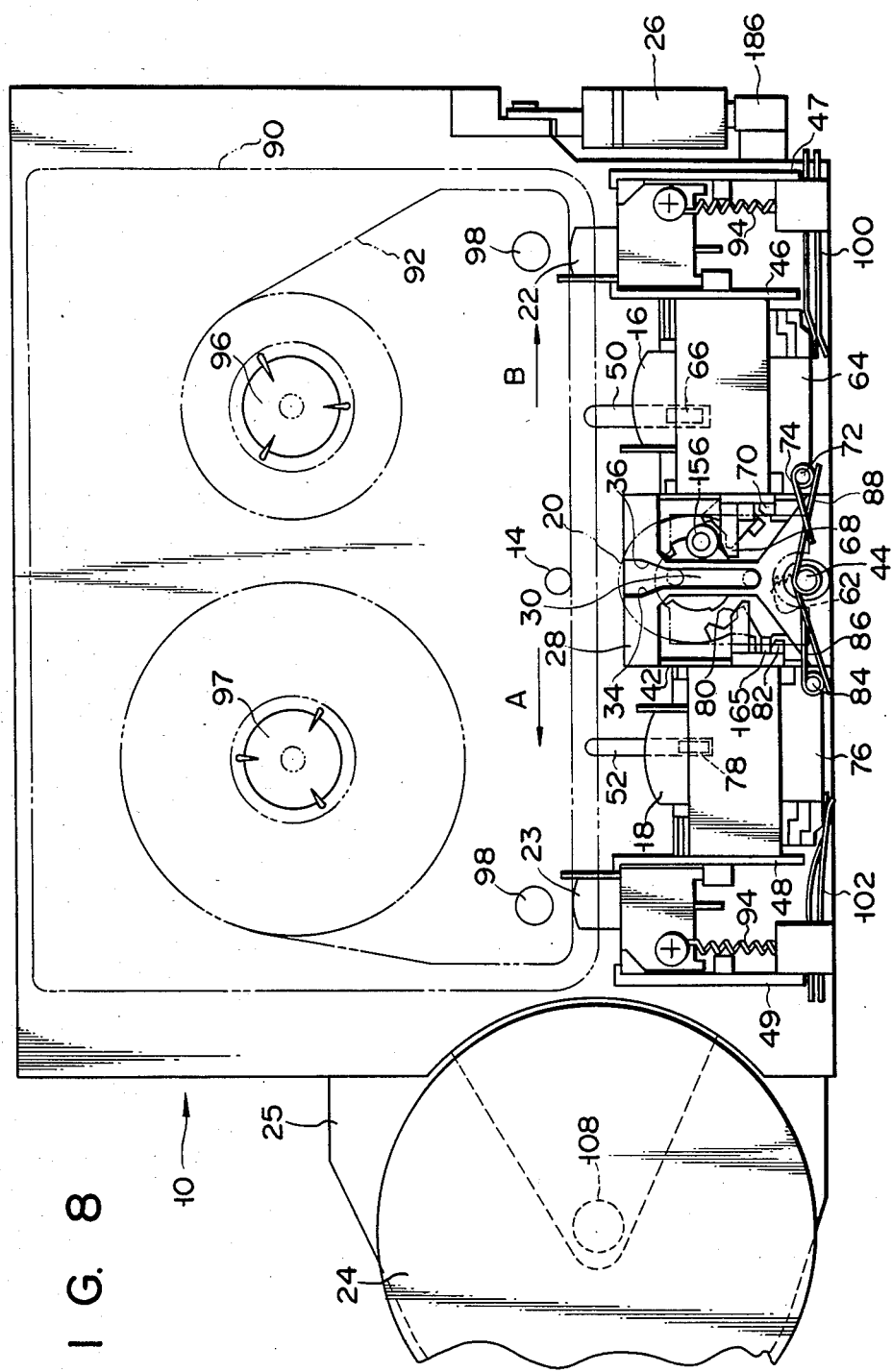
Figure 9:
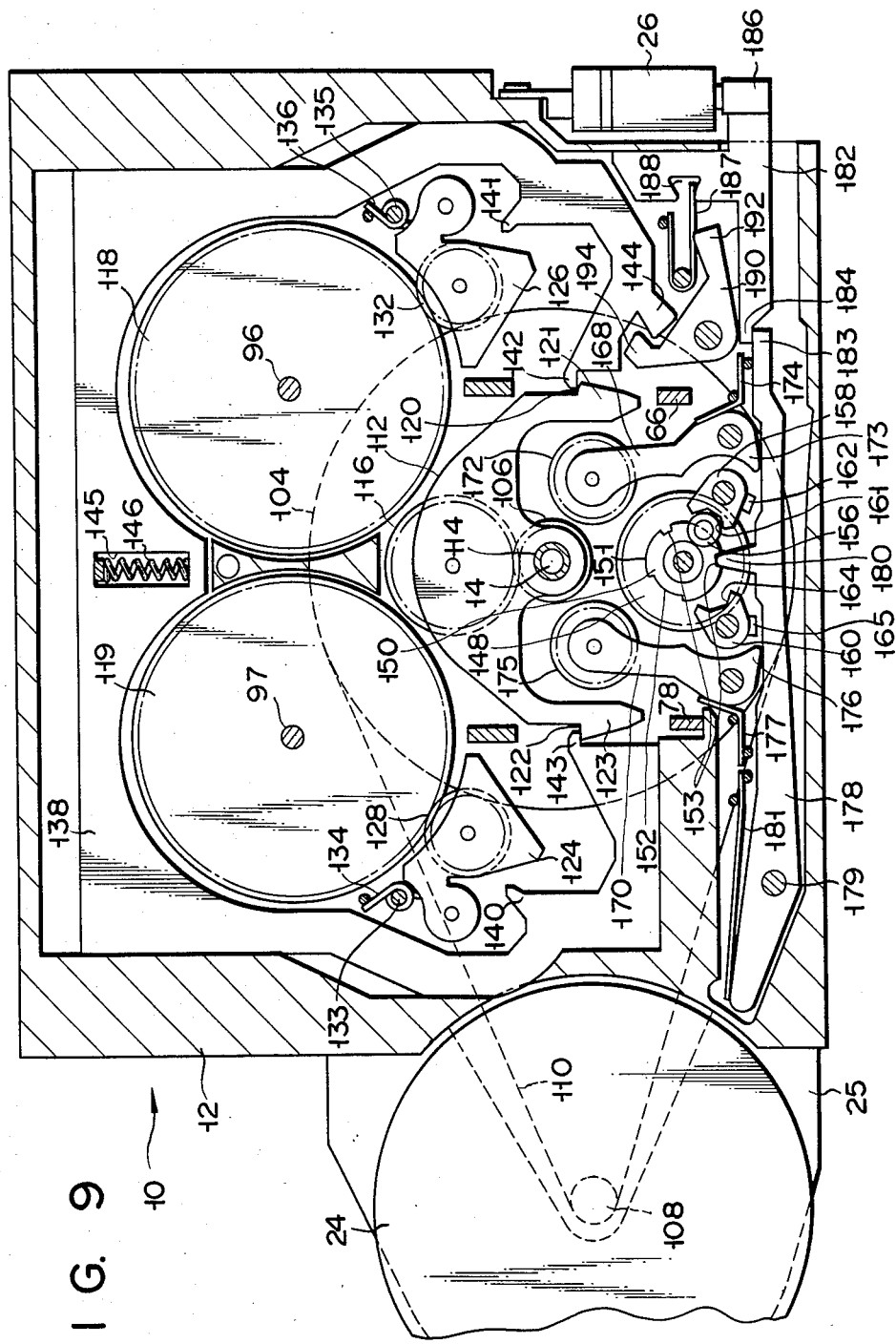

Thereafter, when the rotation of the motor 24 is stopped, a stop mode is established as shown in FIGS. 8 and 9. In this stop mode, the first recording/playback head 16 is located in its first retreated position as illustrated. The changeover switch 100 is on, pressed by the support frame 64. The first recording/playback head 16 and the support frame 64 are pushed up by the urging force of the torsion spring 88. However, since the moving gear 148, the cam member 150, and the push roller 156 are restrained from rotating by the retaining claw 180 of the control lever 178, the first head 16 and the support frame 64 are locked to the first retreated positions by the push roller 156. The push roller 156 abuts against the push claw of the support frame 64, and also engages the recess 161 of the retaining member 158. In the stop mode, moreover, the pinch roller 20 and the support frame 54 are located in their respective retreated positions as illustrated, and the second recording/playback head 18 is locked to its second retreated position as in the forward playback mode. In the stop mode, furthermore, the rocking member 126 is urged toward the reel gear 118 by the torsion spring 136, the interlocking gear 132 is in mesh with the reel gear 118, and the rubber ring is in contact with the belt 110 on the outer peripheral surface of the flywheel 104. Likewise, the interlocking gear 128 of the rocking member 124 is in mesh with the reel gear 119, and the rubber ring 130 (see FIG. 5) is in contact with the outer peripheral surface of the flywheel 104.

Thus, when the stop switch is turned on while the magnetic tape 92 is being driven in the first feed direction in the forward playback mode, the moving gear 148, the cam member 150, and the push roller 156 are rotated clockwise. Controlled by the control lever 178, the moving gear 148 is rotated through a first rotation angle, that is, until the retaining claw 180 of the control lever 178 projects into one of the second cam recess 153 of the cam member 150. Meanwhile, the push roller 156 presses the push claw 68 of the support frame 64 to move the first recording/playback head 16 from its advanced position to the first retreated position.

In the stop mode shown in FIGS. 8 and 9, when a playback switch (not shown) is turned on, the trigger magnet 26 is first energized. Thereupon, the boosting plate 182 moves downward, and the control lever 178 rocks clockwise, so that the retaining claw 180 of the control lever 178 is disengaged from the second cam recess 153 of the cam member 150. As a result, the moving gear 148, the cam member 150, and the push roller 156 are allowed to rotate. Then, the first recording/playback head 16 and the support frame 64 are moved upward to the advanced position shown in FIG. 1 by the urging force of the torsion spring 88. Accompanying this, the push roller 156, along with the cam member 150 and the moving gear 148, is rotated counterclockwise, pressed by the push claw 68 of the support frame 64. As the support frame 64 moves upward, the push lug 66 also moves upward and presses the engaging portion 121 of the rocking lever 112 to rock the rocking lever 112 counterclockwise and to move the sliding plate 138 upward against the urging force of the compression spring 146. Accordingly, the idle gear 116 of the rocking lever 112 engages the reel gear 119. As the sliding plate 138 moves upward, the engaging claws 140 and 141 of the sliding plate 138 engage the rocking members 124 and 126, respectively, to separate the same from their corresponding reel gears 119 and 118 and the flywheel 104. As the sliding plate 138 moves upward, moreover, the push portion 144 thereof presses the engaging portion 194 of the push member 190 to rock the push member 190 counterclockwise. In consequence, the push portion 192 of the push member 190 moves the boosting plate 182 upward through the medium of the leaf spring 187. At this point of time, the trigger magnet 26 is already deenergized and has attraction, so that the attraction portion 186 of the boosting plate 182 is attracted to the trigger magnet 26. As the boosting plate 182 moves upward, the control lever 178 is rocked counterclockwise by the urging force of the leaf spring 181. Thus, the retaining claw 180 of the control lever 178 projects into the first cam recess 152 to stop the rotation of the moving gear 148, the cam member 150, and the push roller 156. As the support frame 64 moves upward, moreover, the pinch roller 20 and the support frame 54 are moved along the first guide surface 34 to the first position, pressed by the torsion springs 74.

When the motor 24 is rotated thereafter, the forward playback mode as shown in FIGS. 1 and 4 is established.

Thus, the first recording/playback head 16 located in the first retreated position can easily be moved to the advanced position by the urging force of the torsion spring 88 by only disengaging the retaining claw 180 of the control lever 178 from the second cam recess 153 of the cam member 150.

In the stop mode shown in FIGS. 8 and 9, when a fast-forward switch (not shown) is turned on, the motor 24 is rotated to drive the flywheel 104, along with the capstan 14 and driving gear 106, clockwise at high speed. As the flywheel 104 is rotated in this manner, the rubber ring 130 (see FIG. 5) of the rocking member 124 abutting against the outer peripheral surface of the flywheel 104 is rotated counterclockwise in company with the interlocking gear 128. As a result, the reel gear 119, along with the reel shaft 97, is rotated clockwise by the interlocking gear 128 to drive the magnetic tape 92 in the direction of arrow A at high speed. Thus, a fast-forward mode is established. Since the flywheel 104 is then rotating clockwise, the rocking member 124 is pushed toward the reel gear 119 by the turning effort of the flywheel 104 through the medium of the rubber ring 130. Accordingly, the interlocking gear 128 securely engages the reel gear 119 to rotate the same. As the flywheel 104 is rotated clockwise, moreover, the rubber ring of the rocking member 126 in contact with the belt 110 on the outer peripheral surface of the flywheel 104 is rotated counterclockwise in company with the interlocking gear 132. Since the flywheel 104 is then rotating clockwise, however, the rocking member 126 is pushed away from the reel gear 118 by the turning effort of the flywheel 104 through the medium of the rubber ring thereof. In the fast-forward mode, therefore, the interlocking gear 132 is not in mesh with the reel gear 118, and the reel gear 118 and the reel shaft 96 are not rotated.

In the stop mode shown in FIGS. 8 and 9, moreover, when a rewinding switch (not shown) is turned on, the motor 24 is rotated to drive the flywheel 104 counterclockwise at high speed. As the flywheel 104 is rotated counterclockwise, the rubber ring of the rocking member 126 in contact with the belt 110 on the outer peripheral surface of the flywheel 104 is rotated clockwise in company with the interlocking gear 132. Also, the reel gear 118 in mesh with the interlocking gear 132, along with the reel shaft 96, is rotated counterclockwise. As a result, the magnetic tape 92 is driven in the direction of arrow B at high speed, and thus a rewinding mode is established. Since the flywheel 104 is then rotating counterclockwise, the rocking member 126 is pushed toward the reel gear 118 by the turning effort of the flywheel 104, so that the interlocking gear 132 securely rotates the reel gear 118. On the other hand, the rocking member 124 is pushed away from the reel gear 119 by the turning effort of the flywheel 104. Therefore, the interlocking gear 128 is not in mesh with the reel gear 119, and the reel gear 119 and the reel shaft 97 are not rotated.

Arranged symmetrically with respect to the flywheel 104 and the capstan 14, the rocking members 124 and 126 selectively rotate the reel gears 119 and 118 in accordance with the rotating direction of the flywheel 104. If the flywheel 104 is rotated clockwise, the rocking member 124 rotates the reel gear 119, and if the flywheel 104 is rotated counterclockwise, then the rocking member 126 rotates the reel gear 118. The drive of the reel gears 119 and 118 by the rocking members 124 and 126 is achieved by the use of the single flywheel 104, and is automatically selected according to the rotating direction of the flywheel 104.

There will now be described the way the forward playback mode is changed over to a reverse playback mode.

In the forward playback mode shown in FIGS. 1 and 4, when a reverse switch (not shown) is turned on, the trigger magnet 26 is first energized. Thereupon, the boosting plate 182 is moved downward by the urging force of the leaf spring 187, as shown in FIG. 7, so that the control lever 178 is rocked clockwise. At the same time, the retaining claw 180 of the control lever 178 is disengaged from the first cam recess 152 of the cam member 150 to allow the cam member 150 and the moving gear 148 to rotate. As the control lever 178 rocks clockwise, the transmission arms 168 and 170 are rocked counterclockwise and clockwise, respectively, by the urging force of their corresponding leaf springs 174 and 177. As a result, the transmission gears 172 and 175 engage the driving gear 106 and the moving gear 148 to rotate the moving gear 148, the cam member 150, and the push roller 156 in the clockwise direction. Hereupon, only the transmission gear 172 drives the moving gear 148, as mentioned before. The push roller 156 presses the push claw 68 of the support frame 64 to move the support frame 64 and the first recording/playback head 16 downward against the urging force of the torsion spring 88. As the support frame 64 is moved downward, the push lug 66 also moves downward along the first guide slot 50. In consequence, the sliding plate 138 is moved downward by the urging force of the compression spring 146, so that the rocking lever 112 is rocked clockwise to disengage the idle gear 116 from the reel gear 119. As the sliding plate 138 moves downward, moreover, the push portion 144 of the sliding plate 138 presses the engaging portion 194 of the push member 190 to rock the push member 190 counterclockwise. Thus, the push portion 192 of the push member 190 moves the boosting plate 182 upward through the medium of the leaf spring 187. Hereupon, if a reverse switch (not shown) is turned on, the trigger magnet 26 is still energized and its attraction remains zero. Accordingly, the boosting plate 182 is moved again downward by the urging force of the leaf spring 187 without being attracted to the trigger magnet 26. As a result, the control lever 178 is also rocked clockwise to allow the moving gear 148 to rotate, and the transmission gears 172 and 175 engage the driving gear 106 and the moving gear 148. Then, the moving gear 148, the cam member 150, and the push roller 156 are further rotated clockwise. Thus, the push roller 156 presses the push claw 68 of the support frame 64 to move down the support frame 64 and the first recording/playback head 16 to the second retreated position where the push lug 66 abuts against the lower end of the first guide slot 50. As the support frame 64 is moved downward, the pinch roller 20 is moved downward by the urging force of the tension spring 62. Meanwhile, the push roller 156 engages the recess 161 of the retaining member 158 to rock the retaining member 158 counterclockwise. As the retaining member 158 is rocked in this manner, the lock lug 162 of the retaining member 158 moves into the recess 163 (see FIG. 2) formed in the base plate 12, and engages the lock claw 70 of the support frame 64 to lock the support frame 64 and the first recording/playback head 16 to the second retreated position.

Figure 10:
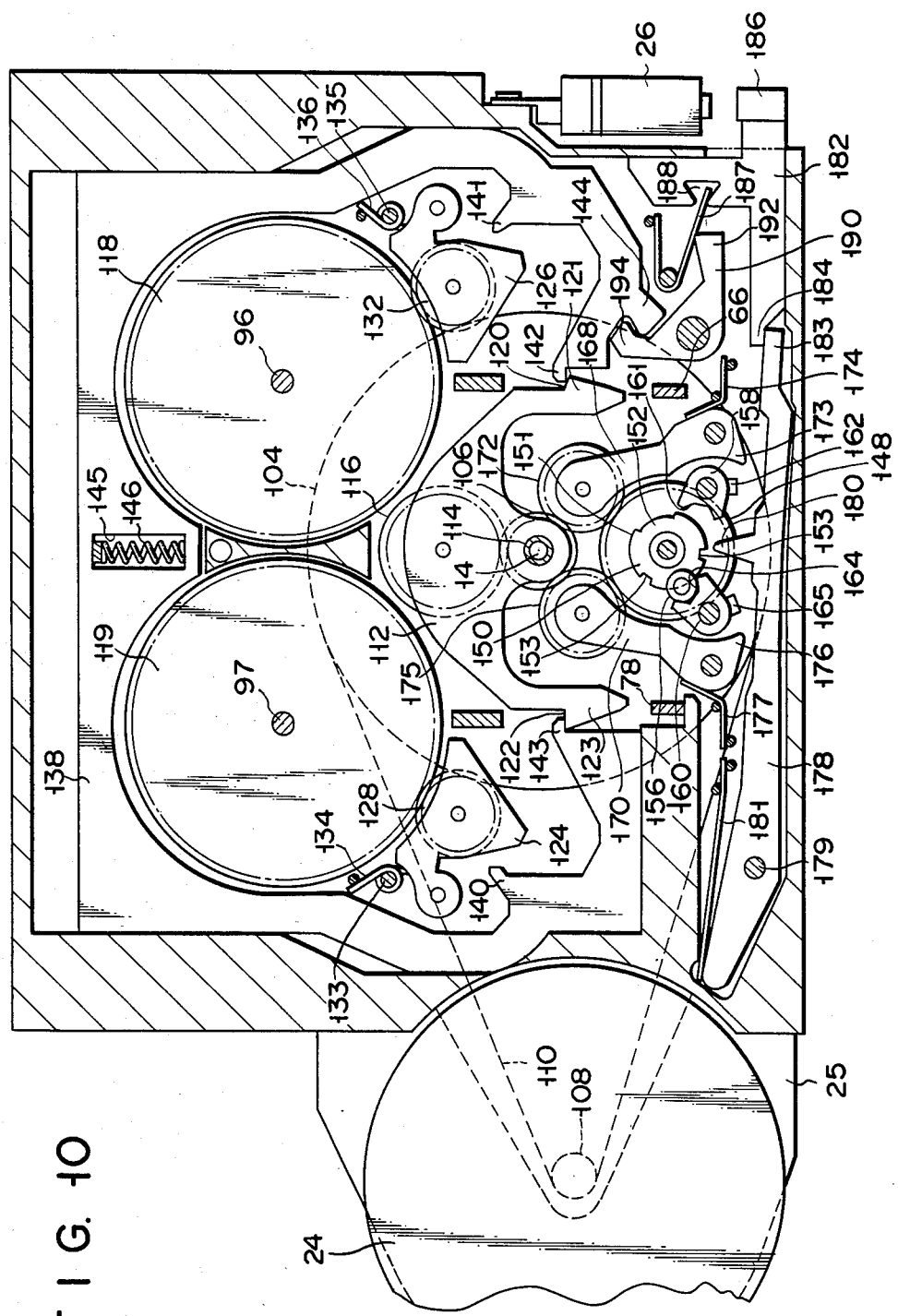

Thereafter, the moving gear 148 is further rocked clockwise, and the push roller 156 engages the recess 164 of the retaining member 160 to rock the retaining member 160 counterclockwise, as shown in FIG. 10. As the retaining member 160 is rocked counterclockwise, the lock lug 165 of the retaining member 160 is disengaged from the recess 166 (see FIG. 2) of the base plate 12 and also from the lock claw 82 (see FIG. 8) of the support frame 76 to unlock the support frame 76 and the second recording/playback head 18. As a result, the second recording/playback head 18 and the support frame 76 are moved upward by the urging force of the torsion spring 88 to the advanced position where the second head 18 abuts against the magnetic tape 92 (see FIG. 8). As the support frame 76 moves in this manner, the push lug 78 is also moved upward. Thus, the push lug 78 presses the engaging portion 123 of the rocking lever 112 to rock the rocking lever 112 clockwise, and also presses the abutting claw 143 of the sliding plate 138 through the medium of the shoulder 122 of the rocking lever 112, thereby moving the sliding plate 138 upward against the urging force of the compression spring 146. As the rocking lever 112 is rocked clockwise, the idle gear 116 engages the reel gear 118. As the sliding plate 138 moves upward, moreover, the push portion 144 of the sliding plate 138 presses the engaging portion 194 of the push member 190 to rock the push member 190 counterclockwise. As a result, the push portion 192 of the push member 190 presses the boosting plate 182 with the aid of the leaf spring 187 to move the boosting plate 182 upward. At this point of time, the trigger magnet 26 is already deenergized and has attraction. Accordingly, the attraction portion 186 of the boosting plate 182 is attracted to the trigger magnet 26. The control lever 178 is rocked counterclockwise by the urging force of the leaf spring 181 to press the engaging portions 173 and 176 of the transmission arms 168 and 170, and the retaining claw 180 projects into the first cam recess 152 of the cam member 150. In consequence, the transmission gears 172 and 175 are disengaged from the driving gear 106 and the moving gear 148, and the moving gear 148 and the cam member 150 are restrained from rotating by the retaining claw 180. As the support frame 76 is moved upward, the changeover switch 102 (see FIG. 8) is turned on. Thus, the motor 24 is changed in its rotation direction by a control circuit (not shown), and the flywheel 104, the driving gear 106, and the capstan 14 are rotated counterclockwise. Moreover, the end portions of the torsion springs 86 press the push portion 61 (see FIG. 3) of the support frame 54 to move the pinch roller 20, along with the support frame 54, upward along the second pinch roller guide surface 36 (see FIG. 8).

Thus, when the reverse switch is turned on while the magnetic tape 92 is being driven in the first feed direction in the forward playback mode, the moving gear 148, the cam member 150, and the push roller 156 are rotated clockwise. Controlled by the control lever 178, the moving gear 148 is rotated clockwise through a second rotation angle, that is, about 360°. Meanwhile, the push roller 156 presses the push claw 68 of the support frame 64 to move the first recording/playback head 16 from the advanced position to the second retreated position. At the same time, the push roller 156 rocks the retaining member 158 to lock the first recording/playback head 16 to the second retreated position.

Figure 11:
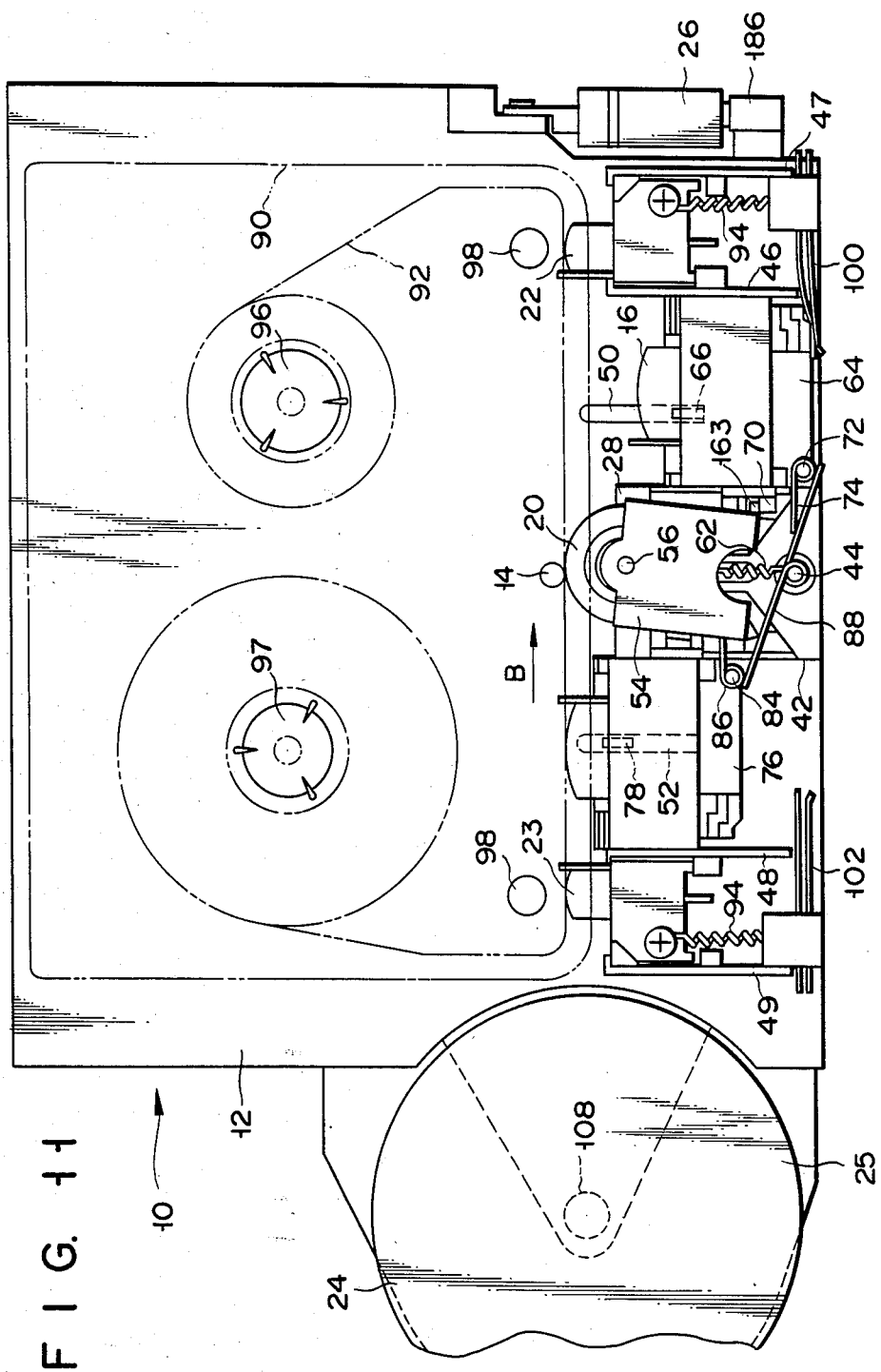
Figure 12:
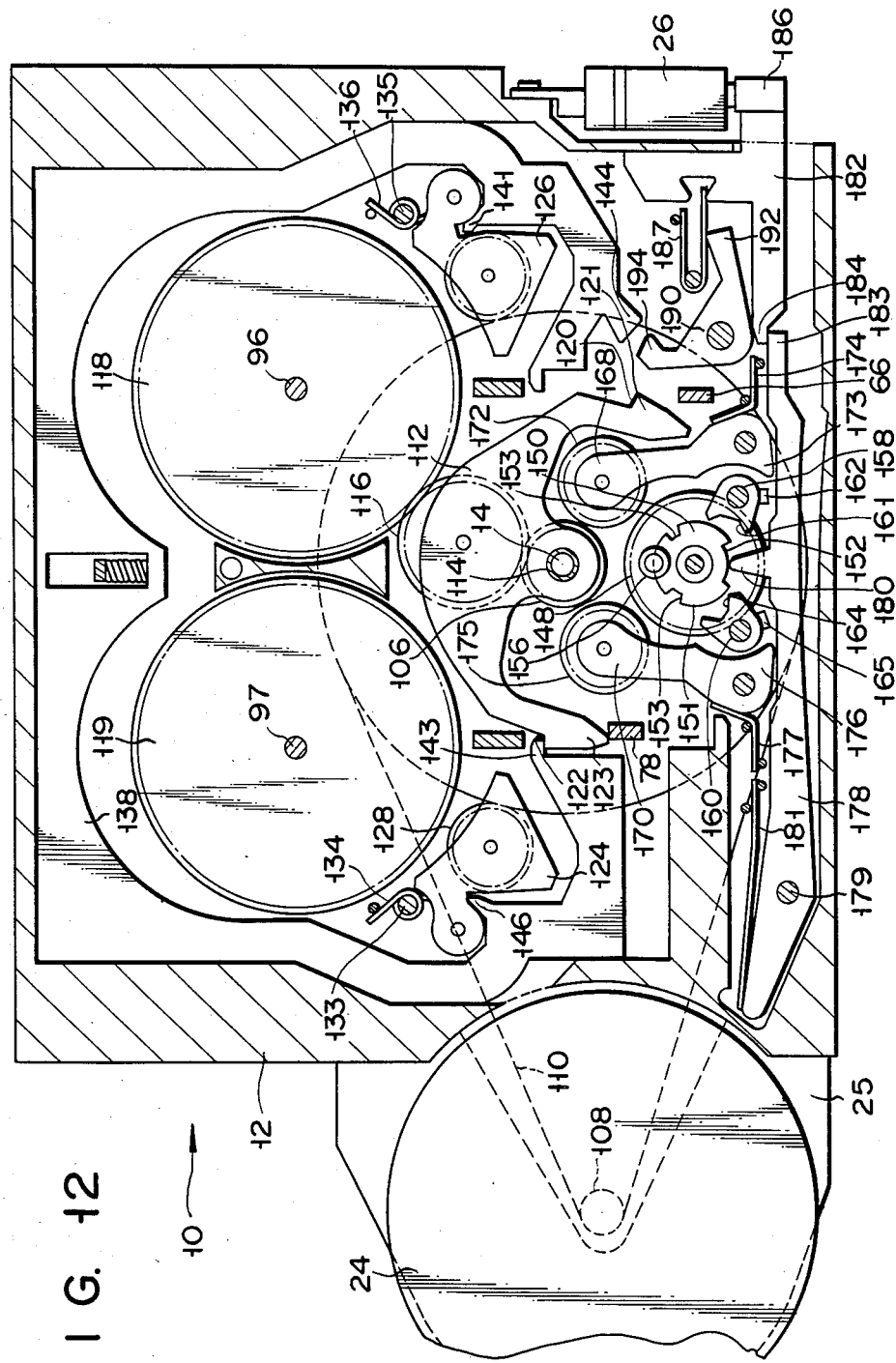

Thus, a reverse playback mode is established as shown in FIGS. 11 and 12. In this mode, the idle gear 116 engages the reel gear 118 to rotate the reel shaft 96, along with the reel gear 118, in the counterclockwise direction. The pinch roller 20 is located in its second position where it is pressed against the capstan 14 with a slight deflection toward the first recording/playback head 16. Thus, the magnetic tape 92 is driven in the second feed direction indicated by arrow B. The second recording/playback head 18 is located in its advanced position where it is in contact with the magnetic tape 92, while the first recording/playback head 16 is locked to the second retreated position as illustrated by the lock lug 162 of the retaining member 158. The changeover switches 100 and 102 are on and off, respectively.

In the reverse playback mode shown in FIGS. 11 and 12, when the stop switch (not shown) is turned on, the transmission gears 172 and 175 engage the driving gear 106 and the moving gear 148 to transmit the driving force of the driving gear 106 to the moving gear 148, as in the case where the stop switch is turned on in the forward playback mode. In the reverse playback mode, however, the driving gear 106 is rotated counterclockwise, so that the moving gear 148 is rotated counterclockwise, in contrast with the case where the stop switch is turned on in the middle of the forward playback mode. Hereupon, only the transmission gear 175 drives the moving gear 148. The moving gear 148, the cam member 150, and the push roller 156 are rotated counterclockwise through the first rotation angle, that is, until the retaining claw 180 of the control lever 178 projects into the second cam recess 153. As a result, the second recording/playback head 18 and the support frame 76 are moved from the advanced position to the first retreated position (not shown), pressed by the push roller 156. In the reverse playback mode, when the reverse switch (not shown) is turned on, the moving gear 148 is rotated counterclockwise through the second rotation angle or about 360° by the driving gear 106 through the medium of the transmission gears 172 and 175. Meanwhile, the push roller 156 moves the second recording/playback head 18 and the support frame 76 to the second retreated position, and also rocks the retaining member 160 so that the second recording/playback head 18 is locked to the second retreated position by the lock lug 165. Thereafter, the push roller 156 rocks the retaining member 158 to release the first recording/playback head 16 and to move the same to its advanced position. Then, the retaining claw 180 of the control lever 178 projects into the first cam recess 152 to stop the push roller 156 from rotating. Thus, the forward playback mode is established as shown in FIGS. 1 and 4.

In this manner, while the driving gear 106 is being rotated clockwise, the transmission gear 172 engages the driving gear 106 and the moving gear 148 to rotate the moving gear 148 clockwise. While the moving gear 148 is being rotated clockwise, the push roller 156 moves the first recording/playback head 16 to the first or second retreated position, and also engages the retaining member 158 to actuate the same. While the driving gear 106 is being rotated counterclockwise, on the other hand, the transmission gear 175 engages the driving gear 106 and the moving gear 148 to rotate the moving gear counterclockwise. While the moving gear 148 is being rotated counterclockwise, the push roller 156 moves the second recording/playback head 18 to the first or second retreated position, and also engages the retaining member 160 to actuate the same.

Thus, the transmission gears 172 and 175 selectively rotate the moving gear 148 in accordance with the rotating direction of the driving gear 106. The moving gear 148 is rotated in a specified direction depending on the rotating direction of the driving gear 106, whereby the push roller 156 selectively moves the first or second recording/playback head 16 or 18. Likewise, the retaining member 158 or 160 is selectively operated in accordance with the rotating direction of the driving gear 106. The operations of the transmission gears 172 and 175, the moving gear 148, the push roller 156, and the retaining members 158 and 160 are automatically selected in accordance with the rotating direction of the driving gear 106.

Figure 13:
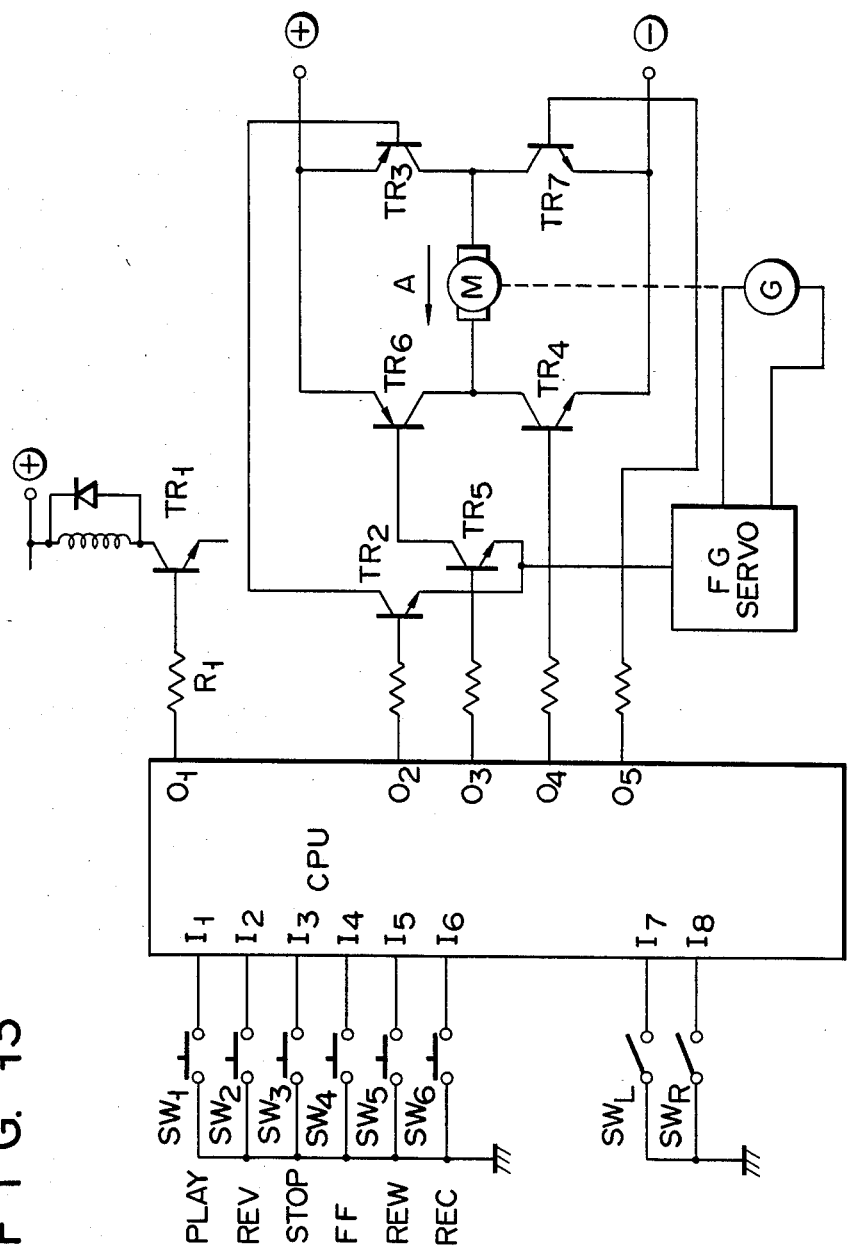
FIG. 13 is a circuit diagram of a motor control circuit.

Referring now to FIG. 13, there will be given an outline of the motor control circuit for controlling the rotation of the motor 24.

Mode setting switches $SW_1$, $SW_2$, $SW_3$, $SW_4$, $SW_5$ and $SW_6$ of the tape recorder 10 are connected to input terminals $I_1$, $I_2$, $I_3$, $I_4$, $I_5$ and $I_6$ of a central processing unit (CPU), respectively. Other input terminals $I_7$ and $I_8$ of the CPU are connected to the changeover switches 100 ($SW_R$) and 102 ($SW_L$) (see FIG. 1), respectively, located under the first and second recording/playback heads 16 and 18, respectively.

An output terminal $O_1$ of the CPU is connected to the trigger magnet 26 (see FIG. 1) through a resistor $R_1$ and a transistor $TR_1$. Other output terminals $O_2$, $O_3$, $O_4$ and $O_5$ of the CPU are connected individually to motor control transistors $TR_2$, $TR_3$, $TR_4$, $TR_5$, $TR_6$ and $TR_7$. The CPU has still other control outputs, such as that for a tape recorder amplifier, which are omitted from the description herein.

If the playback mode switch $SW_1$ is turned on, a playback signal is applied to the CPU. Based on processing in the CPU, a signal for energizing the trigger magnet 26 is first delivered from the output terminal $O_1$. Then, detecting the on-state switch out of the two changeover switches $SW_R$ and $SW_L$, the CPU delivers a signal to rotate the motor 24 in a rotating direction for the use of that recording/playback head which corresponds to the off-state switch. If the switches $SW_R$ and $SW_L$ are off and on, respectively, then the motor rotates in the direction corresponding to the first recording/playback head, that is, in the clockwise direction. When the CPU detects that the switches $SW_R$ and $SW_L$ are off and on, respectively, the trigger magnet is deenergized by the signal from the output terminal $O_1$, and then signals are delivered from the output terminals $O_2$ and $O_4$ to turn on the transistors $TR_2$, $TR_3$ and $TR_4$. As a result, current from the power supply flows in the direction of arrow A to rotate the motor clockwise. An FG servo circuit shown in FIG. 13 serves to control the rotational speed of the motor with the aid of a generator G associated with the motor.

On the other hand, if the switches $SW_R$ and $SW_L$ are on and off, respectively, then signals are delivered from the output terminals $O_3$ and $O_5$ of the CPU to turn on the transistors $TR_5$, $TR_6$ and $TR_7$. As a result, the current flows in the opposite direction to the direction of arrow A to rotate the motor counterclockwise.

Then, if the reverse mode switch $SW_2$ is turned on, the CPU energizes the trigger magnet, as in the case of the playback mode, and then detects the on-off state of the switches $SW_R$ and $SW_L$. Then, after deenergizing the trigger magnet, the CPU reverses the motor. While the signals are being delivered from the output terminals $O_2$ and $O_4$ of the CPU, the motor is reversed by inactivating these signals and activating the signals from the output terminals $O_3$ and $O_5$.

If the stop mode switch $SW_3$ is turned on, the signal from the output terminal $O_1$ of the CPU is activated, and then a motor rotation signal is inactivated to establish the stop mode.

The fast-forward and rewinding modes are established by rotating the motor in the stop mode. If the switch $SW_4$ or $SW_5$ is turned on, such a signal is delivered from the corresponding output terminal of the CPU that the motor is rotated in the specified direction.

If the recording mode switch $SW_6$ is turned on, the recording/playback heads function as recording heads and the erasing head is actuated in response to a signal from the CPU after going through the same operations for the playback mode.

According to the tape recorder 10 of this invention, as described in detail herein, the first and second recording/playback heads 16 and 18 are shifted by the driving force of the motor 24. Namely, the driving force of the driving gear 106 rotated by the motor 24 is transmitted to the moving gear 148 by the transmission gears 172 and 175. As the moving gear 148 is rotated, the push roller 156 rotates to move the first and second recording playback heads 16 and 18. Thus, in the tape recorder 10, the first and second recording/playback heads 16 and 18 are shifted by the agency of the motor 24 for rotating the capstan 14. It is therefore unnecessary to provide the tape recorder 10 with a plunger or a separate exclusive-use motor for shifting the recording/playback heads. Thus, the tape recorder 10 can enjoy miniaturization and improved economical efficiency despite the capability of electrical shifting of the recording/playback heads.

The reel shaft drive means including the rocking lever 112, the idle gear 116, the reel gears 118 and 119 and the rocking members 124 and 126, the rocking means including the moving gear 148, the cam member 150, and the push roller 156, the transmission means including the transmission arms 168 and 170 and the transmission gears 172 and 175, and the retaining means including the retaining members 158 and 160 are individually symmetrical with respect to the vertical line passing through the capstan 14. Accordingly, the operations of these means can be automatically selected in accordance with the rotating direction of the drive means including the driving gear 106 and the flywheel 104. Thus, the tape recorder 10 of this invention can perform the recording/playback head shifting and the switching of the reel shaft drive direction by the use of a simple structure without requiring any switching member for changing the operations of the aforesaid individual means.

The first and second recording/playback heads 16 and 18 are moved to the first or second retreated position by a single rocking means. Accordingly, the tape recorder 10 can move by the use of a simple structure the recording/playback heads 16 and 18 to the first or second retreated position in accordance with the magnetic tape feed direction or the operation mode.

The pinch roller 20 is moved to the first or second position by the pinch roller transfer mechanism which includes the guide groove 30 having the first and second pinch roller guide surfaces and the torsion springs 74 and 86 attached to the support frames 64 and 76. Thus, in the tape recorder 10, the pinch roller 20 can be moved to the first or second position in accordance with the magnetic tape feed direction by a simple structure.

It is to be understood that this invention is not limited to the aforementioned embodiment, and that various changes and modifications may be effected therein by one skilled in the art without departing from the scope or spirit of the invention. For example, this invention is not limited to the auto-reverse-type tape recorder, and may also be applied to any other tape recorders in which the magnetic heads are shifted electrically. The first and second magnetic heads are not limited to the recording/playback heads, and may alternatively be playback heads. Instead of being the torsion springs 74 and 86, moreover, the pinch roller push members for pressing the pinch roller 20 may be leaf springs or any other suitable spring members.

What is claimed is:

1. A tape recorder which includes a capstan rotatably supported by a base, a flywheel attached to the capstan, and a pair of reel shafts rotatably supported by the base, comprising:

drive means for rotating the capstan;

magnetic reproducing means for reproducing data from a magnetic tape, said reproducing means being arranged on the base to reciprocate along a predetermined direction between an advanced position where the reproducing means is in contact with a magnetic tape and a retreated position where the reproducing means is spaced from the magnetic tape;

rotating means rotatably supported by the base for moving the reproducing means in the predetermined direction when the rotating means is rotated;

transmission means for engaging with the drive means and the rotating means to transmit the driving force of the drive means to the rotating means to rotate the rotating means;

control means for controlling the engagement of the transmission means with the rotating means and the drive means thereby controlling the movement of the magnetic reproducing means, said control means including: locking means normally engaged with the transmission means to disengage the latter from at least one of the rotating means and drive means and operable to disengage the locking means from the transmission means to engage the transmission means with the rocking means and the drive means; and operating means for selectively urging the locking means to a position where the locking means is disengaged from the transmission means, and means to normally hold the locking means in a position where the locking means is engaged with the transmission means; and mode setting means to establish a desired operation mode of the tape recorder.

2. The tape recorder according to claim 1, wherein said drive means includes a driving gear mounted on the flywheel to be coaxial with the capstan, and a motor for rotating the capstan, the flywheel, and the driving gear in two directions, and which further comprises reel shaft drive mechanism for selectively driving one of the reel shafts corresponding to the rotating direction of the motor by using the driving force of the drive means, whereby the magnetic tape is driven in a first or second feed direction depending on the rotating direction of the motor.

3. The tape recorder according to claim 2, wherein said rotating means, transmission means, magnetic reproducing means and reel shaft drive mechanism are individually symmetrical with respect to a line passing through the capstan and perpendicular to the magnetic tape feed direction.

4. The tape recorder according to claim 2, wherein said locking means includes a control lever pivotally mounted on the base for pivoting between an operating position and a non-operating position, the control lever engaging, when in the operating position, with the rotating means to prevent the rotating means from rotating and positioning the transmission means to disengage the transmission means from the drive means and the rotating means; said control lever, when in the non-operating position, disengaging from the rotating means and the transmission means.

5. The tape recorder according to claim 4, wherein said operating means includes a control-lever-urging member for urging the control lever toward the operating position, a boosting member mounted on the base for movement between first and second positions and adapted to pivot the control lever to the non-operating position by moving from the first position to the second position, and a boosting-member-urging member urging the boosting member toward the second position.

6. The tape recorder according to claim 4, wherein said magnetic reproducing means includes a first magnetic head adapted to be engaged with the magnetic tape when the magnetic tape is driven in the first feed direction, and a second magnetic head adapted to be engaged with the magnetic tape when the magnetic tape is driven in the second feed direction, and the first and second magnetic heads are arranged for reciprocating movement along a direction normal to the magnetic tape feed direction and so that the capstan is located between said heads, and which further comprises a head urging member urging the first and second magnetic head toward the advanced position.

7. The tape recorder according to claim 6, wherein said rotating means includes a moving gear rotatably mounted on the base, a discoid cam member coaxially attached to the moving gear, and a push member attached to the cam member and capable of pressing the first and second magnetic heads, and the transmission means includes a pair of transmission arms located so that the moving gear is located between the transmission arms and pivotally mounted on the base, transmission gears rotatably mounted on the transmission arms, individually, and capable of engaging with the driving gear and the moving gear, and transmission arm urging members individually urging the transmission arms in such directions that the transmission gears engage with the driving gear and the moving gear, whereby the moving gear is rotated in the direction corresponding to the rotating direction of the driving gear, so that the push member presses the first or second magnetic head in its advanced position toward its retreated position.

8. The tape recorder according to claim 7, wherein said control means includes a control lever mounted on the base for pivoting between an operating position and a nonoperating position, the control lever engaging, when in the operating position, with the cam member to restrain the cam member from moving and pressing the transmission arms to disengage the transmission gears from the driving gear and the moving gear, and disengaging, when in the nonoperating position, from the cam member and the transmission arms, and operating means for controlling the pivoting of the control lever.

9. The tape recorder according to claim 8, wherein said operating means includes a control lever urging member urging the control lever toward the operating position, a boosting member mounted on the base for movement between first and second positions and adapted to pivot the control lever to the non-operating position by moving from the first position to the second position, a boosting member urging member urging the boosting member toward the second position, and attraction means attracting the boosting member to hold the same in the first position and capable of losing attraction.

10. The tape recorder according to claim 9, wherein said attraction means includes a trigger magnet having a magnet and a coil thereon and so designed that the attraction of the magnet is removed by energizing the coil.

11. The tape recorder according to claim 8, wherein said cam member has a cam face formed of the outer peripheral surface thereof, a first cam recess formed in the cam face to be diametrically opposite to the push member, and a pair of second cam recesses formed in the cam face to be located between the first cam recess and the push member and at equal distances from the first cam recess, and the control lever has a retaining claw capable of sliding on the cam face and engaging the first and second cam recesses, the cam member being selectively movable from an initial position where the retaining claw engages the first cam recess to a first pivotal position where the retaining claw engages one of the second cam recess, or through about 360 degrees from the initial position, and the push member moving the first or second magnetic head in its advanced position to a first retreated position as the cam member moves from the initial position to the first pivotal position, and moving the magnetic head in the advanced position to a second retreated position as the cam member moves through about 360 degrees from the initial position.

12. The tape recorder according to claim 11, which further comprises retaining means for locking the first and second magnetic heads to their respective second retreated positions.

13. The tape recorder according to claim 12, wherein said retaining means is symmetrical with respect to a line passing through the capstan and perpendicular to the magnetic tape feed direction.

14. The tape recorder according to claim 12, wherein said retaining means includes first and second retaining members pivotally mounted on the base and located so that the cam member is provided between the retaining members, each retaining member having a recess capable of engaging the push member and a lock lug capable of engaging each corresponding magnetic head, and the push member engages the recess of one of the retaining members to pivot the retaining member as the cam member moves through 360 degrees from the initial position in a direction corresponding to the rotating direction of the drive means, whereby the magnetic head corresponding to the retaining member is locked to the second retreated position by the lock lug.

15. The tape recorder according to claim 14, wherein said magnetic reproducing means includes a pair of support frames individually supporting the magnetic heads and moving together therewith, each support frame having a push claw extending toward the cam member and adapted to be pressed by the push member, and a lock claw extending toward the cam member and capable of engaging the lock lug of each corresponding retaining member when in the second retreated position of each corresponding magnetic head.

16. The tape recorder according to claim 6, wherein said reel shaft drive mechanism includes a pair of reel gears attached individually to the reel shafts and rotatable together therewith, a rocking lever pivotable around the capstan, and an idle gear rotatably mounted on the rocking lever and in mesh with the driving gear, the idle gear being capable of selectively engaging one of the reel gears.

17. The tape recorder according to claim 16, wherein said rocking lever has a pair of engaging portions located so that the capstan is between the engaging portions, and the magnetic reproducing means includes a pair of support frames individually supporting the first and second magnetic heads and moving together therewith, each support frame having a push lug capable of abutting against its corresponding engaging portion of the rocking lever, the push lug being adapted to press the corresponding engaging portion of the rocking lever to pivot the rocking lever in a specified direction as each corresponding magnetic head moves from the retreated position to the advanced position thereof, whereby the idle gear is engaged each corresponding reel gear.

18. The tape recorder according to claim 17, wherein said reel shaft drive mechanism includes a pair of rocking members pivotably mounted so that the flywheel is between the rocking members, each rocking member having an interlocking member adapted to engage the reel gear and the flywheel to drive the reel gear by the driving force of the flywheel, urging members individually urging the rocking members in such directions that the interlocking members engage their corresponding reel gears and the flywheel, and a sliding plate mounted on the base for sliding in association with the rocking lever and adapted to press the rocking members from the reel gears and the flywheel when one of the magnetic heads is in the advanced position thereof.

19. The tape recorder according to claim 6, which further comprises pinch roller means movably supported by the base to be located between the first and second magnetic heads, and a pinch roller transfer mechanism adapted to move the pinch roller means to a first position thereof where the pinch roller means is pressed against the capstan with a slight deflection toward the second magnetic head when the magnetic tape is driven in the first feed direction, and to move the pinch roller means to a second position thereof where the pinch roller means is pressed against the capstan with a slight deflection toward the first magnetic head when the magnetic tape is driven in the second feed direction.

20. The tape recorder according to claim 19, wherein said pinch roller means includes a pinch roller adapted to be pressed against the capstan and a pinch roller support frame movably supported on the base and supporting the pinch roller, and said pinch roller transfer mechanism includes a first pinch roller guide formed on the base to guide the pinch roller means to the first position thereof, a second pinch roller guide formed on the base to guide the pinch roller means to the second position thereof, an urging member urging the pinch roller means to be separated from the capstan, a first pinch roller push member attached to the first magnetic head and adapted to press the pinch roller means in association with the movement of the first magnetic head from the retreated position to the advanced position thereof, thereby moving the pinch roller means along the first pinch roller guide to the first position, and a second pinch roller push member attached to the second magnetic head and adapted to press the pinch roller means in association with the movement of the second magnetic head from the retreated position to the advanced position thereof, thereby moving the pinch roller means along the second pinch roller guide to the second position.

21. The tape recorder according to claim 20, wherein said first and second pinch roller push members are spring members to give the pinch roller a predetermined force with which the pinch roller is pressed against the capstan.

22. The tape recorder according to claim 1, wherein said drive means includes a motor for rotating the capstan in two directions, and said magnetic reproducing means includes first and second magnetic heads which are arranged on the base so that the capstan and rotating means are provided between the magnetic heads, whereby the rotating means selectively moves one of the magnetic heads corresponding to the rotating direction of the capstan.

23. The tape recorder according to claim 1, wherein the means to normally hold the locking means in engagement with the transmission means comprises a trigger magnet having a magnet and a coil thereon for normally attracting the locking means, the attraction of the magnet being removed upon energization of the coil.

24. The tape recorder according to claim 23, wherein the mode setting means energizes the driving means and the coil of said trigger magnet to establish a desired operation mode of the tape recorder.

25. The tape recorder according to claim 1, wherein said reel shaft drive mechanism includes a pair of reel gears attached individually to the reel shafts and rotatable together therewith, a rocking lever pivotable around the capstan, and an idle gear rotatably mounted on the rocking lever and in mesh with the driving gear, the idle gear being capable of selectively engaging one of the reel gears.

26. The tape recorder according to claim 25, wherein said rocking lever has a pair of engaging portions located so that the capstan is between the engaged portions and, the magnetic reproducing means includes a pair of support frames individually supporting the first and second magnetic heads and moving together therewith, each support frame having a push lug capable of abutting against its corresponding engaging portion of the rocking lever, the push lug being adapted to press the corresponding engaging portion of the rocking lever to pivot the rocking lever in a specified direction as each corresponding magnetic head moves from the retreated position to the advanced position thereof, whereby the idle gear is engaged with each corresponding gear.

27. The tape recorder according to claim 26, wherein said reel shaft drive mechanism includes a pair of rocking member pivotally mounted so that the flywheel is between the rocking members, each rocking member having an interlocking member adapted to engage the reel gear and the flywheel to drive the reel gear by the driving force of the flywheel, urging members individually urging the rocking members in such directions that the interlocking members engage their corresponding reel gears and the flywheel, and a sliding plate mounted on the base for sliding in association with the rocking lever and adapted to press the rocking members to disengage the interlocking members from the reel gears and the flywheel when one of the magnetic heads is in the advanced postion thereof.

28. A tape recorder which includes a capstan rotatably supported by a base, a flywheel attached to the capstan, and a pair of reel shafts rotatably supported by the base, comprising:
drive means for rotating the capstan in either of two directions;
first and second magnetic heads adapted to alternately engage a magnetic tape, each of said heads being arranged on the base to reciprocate along a predetermined direction between an advanced position where the magnetic head is in contact with a magnetic tape and a retreated position where the magnetic head is spaced from the magnetic tape, said first and second magnetic heads being arranged so that the capstan is located between the heads;
rotating means rotatably supported by the base for moving the one of the first and second magnetic heads which engages the magnetic tape in the predetermined direction;
transmission means for engaging with the drive means and the rotating means to transmit the driving force of the drive means to the rotating means to rotate the rotating means; and
control means for controlling the engagement of the transmission means with the rotating means and the drive means, thereby controlling the movement of the first and second magnetic heads.

29. The tape recorder according to claim 28, which further comprises head urging means for urging the first and second magnetic heads toward the advanced position; and wherein said rotating means includes a push member for pressing he first and second magnetic head from its advanced position toward its retreated position when the rotating means is pivoted.

30. A tape recorder which includes a capstan rotatably supported by a base, a flywheel attached to the capstan, and a pair of reel shafts rotatably supported by the base, comprising:
drive means for rotating the capstan and including a driving gear mounted on the flywheel to be coaxial with the capstan, and a motor for rotating the capstan, the flywheel, and the driving gear in two directions, and which further comprises reel shaft drive mechanism for selectively driving one of the reel shafts corresponding to the rotating direction of the motor by using the driving force of the drive means, whereby the magnetic tape is driven in a first or second feed direction depending on the rotating direction of the motor;
magnetic reporducing means arranged on the base for reciprocation along a predetermined direction between an advanced position where the reproducing means in in contact with a magnetic tape and a retreated position where the reproducing means is separated from the magnetic tape, said magnetic reproducing means includes a first magnetic head adapted to be engaged with the magnetic tape when the magnetic tape is driven in the first feed direction, and a second magnetic head adapted to be engaged with the magnetic head when the magnetic tape is driven in the second feed direction, and the first and second magnetic heads are arranged for reciprocating movement and so that the capstan is located between said heads along a direction normal to the magnetic tape feed direction, and which further comprises a head urging member urging the first and second magnetic head toward the advanced position;
rotating means rotatably supported by the base for engaging with the magnetic reproducing means to move the reproducing means in the predetermined direction by rotating, wherein said rotating means includes a moving gear rotatably mounted on the base, a discoid cam member coaxially attached to the moving gear, and a push member attached to the cam member and capable of pressing the first and second magnetic heads, and the transmission means includes a pair of transmission arms located so that the moving gear is located between the transmission arms and pivotally mounted on the base, transmission gears rotatably mounted on the transmission arms, individually, and capable of engaging with the driving gear and the moving gear, and the transmission-arm-urging members indivudually urging the transmission arms in such directions that the transmission gears engage with the driving gear and the moving gear, whereby the moving gear is rotated in the direction corresponding to the rotating directions of the driving gear, so that the push member presses the first or second magnetic head in its advanced position toward its retreated position;

transmission means for engaging with the drive means and the rotating means to transmit the driving force of the drive means to the rotating means to rotate the rotating means; and control means for controlling the engagement of the transmission means with the cam means and the drive means and the rotation of the rotating means, thereby controlling the movement of the magnetic reproducing means.

31. The tape recorder according to claim 30, wherein said control means includes a control lever mounted on the base for pivoting between an operating position and a nonoperating position, the control lever engaging, when in the operating position, with the cam member to retrain the cam member from moving and pressing the transmission arms to diengage the transmission gears from the driving gear and the moving gear, and disengaging, when in the nonoperating position, from the cam member and the transmission arms, and operating means for controlling the pivoting of the control lever.

32. The tape recorder according to claim 31, wherein said operating means includes a control-lever-urging member urging the control lever toward the operating position, a boosting member mounted on the base for movement between first and second positions and adapted to pivot the control lever to the nonoperating position by moving from the first position to the second position, a boosting member urging member urging the boosting member toward the second position, and attraction means attracting the boosting member to hold the same in the first position and capable of losing attraction.

33. The tape recorder according to claim 32, wherein said attraction means includes a trigger magnet having a magnet and a coil thereon and so designed that the attraction of the magnet is removed by energizing the coil.

34. The tape recorder according to claim 32, wherein said cam member has a cam face formed of the outer peripheral surface thereof, a first cam recess formed in the cam face to be diametrically opposite to the push member, and a pair of second cam recesses formed in the cam face to be located between the first cam recess and the push member and at equal distances from the first cam recess, and the control lever has a retaining claw capable of sliding on the cam face and engaging the first and second cam recesses, the cam member being selectively movable from an initial position where the retaining claw engages the first cam recess to a first pivotal position where the retaining claw engages one of the second cam recess, or through about 360 degress from the initial position, and the push member moving the first or second magnetic head in its advanced position to a first retreated position as the cam member moves from the initial position to the first pivotal position, and moving the magnetic head in the advanced position to a second retreated position as the cam member moves through about 360 degrees from the initial position.

35. The tape recorder according to claim 34, which further comprises retaining means for locking the first and second magnetic heads to their respective second retreated positions.

36. The tape recorder according to claim 35, wherein said retaining means includes first and second retaining member pivotally mounted on the base and located so that the cam member is provided between the retaining member, each retaining member having a recess capable of engaging the push member and a lock lug capable of engaging each corresponding magnetic head, and the push member engages the recess of one of the retaining member to pivot the retaining member as the cam member moves through 360 degrees from the initial position in a direction corresponding to the rotating direction of the drive means, whereby the magnetic head corresponding to the retaining member is locked to the second retreated position by the lock lug.

37. The tape recorder according to claim 36, wherein said magnetic reproducing means includes a pair of support frames individually supporting the magnetic heads and moving together therewith, each support frames having a push claw extending toward the cam member and adapted to be pressed by the push member, and a lock claw extending toward the cam member and capable of engaging the lock lug each corresponding retaining member when in the second retreated position of each corresponding magnetic head.

38. The tape recorder according to claim 30, which further comprises pinch roller means movably supported by the base to be located between the first and second magnetic heads, and a pinch roller transfer mechanism adapted to move the pinch roller means to a first position thereof where the pinch roller means is pressed against the capstan with a slight deflection toward the second magnetic head when the magnetic tape is driven in the first feed direction, and to move the pinch roller means to a second position thereof where the pinch roller means is pressed against the capstan with a slight defection toward the first magnetic head when the magnetic tape is driven in the second feed direction.

39. The tape recorder according to claim 38, wherein said pinch roller means includes a pinch roller adapted to be pressed against the capstan and a pinch roller support frame movably supported on the base and supporting the pinch roller, and said pinch roller transfer mechanism includes a first pinch roller guide formed on the base to guide the pinch roller means to the second position thereof, an urging member urging the pinch roller means to be separated from the capstan, a first pinch roller push member attached to the first magnetic head and adapted to press the pinch roller means in association with the movement of the first magnetic head from the retreated position to the advanced position thereof, thereby moving the pinch roller means along the first pinch roller guide to the first position, and a second pinch roller push member attached to the second magnetic head and adapted to press the pinch roller means in association with the movement of the second magnetic head from the retreated position to the advanced position thereof, thereby moving the pinch roller means along the second pinch roller guide to the second position.

40. The tape recorder according to claim 39, wherein said first and second pinch roller push members are spring members to give the pinch roller a predetermined force with which the pinch roller is pressed against the capstan.

* * * * *